United States Patent
Inoue et al.

(10) Patent No.: US 7,496,084 B2
(45) Date of Patent: Feb. 24, 2009

(54) MOBILE NODE, A CONTROL METHOD THEREOF, AND A MOBILE NODE CONTROL PROGRAM

(75) Inventors: Masahiro Inoue, Yokosuka (JP); Koji Omae, Yokohama (JP); Ichiro Okajima, Gyoda (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 11/169,647

(22) Filed: Jun. 30, 2005

(65) Prior Publication Data

US 2006/0003807 A1    Jan. 5, 2006

(30) Foreign Application Priority Data

Jun. 30, 2004   (JP)   ............................. 2004-193717
Sep. 22, 2004   (JP)   ............................. 2004-275589

(51) Int. Cl.
    H04J 3/24    (2006.01)
(52) U.S. Cl. ....................................................... 370/349
(58) Field of Classification Search ............. 455/552.1, 455/553.1, 426.1; 370/349
    See application file for complete search history.

(56) References Cited

U.S. PATENT DOCUMENTS

| | | | | |
|---|---|---|---|---|
| 5,426,637 A | * | 6/1995 | Derby et al. ................. | 370/401 |
| 5,903,568 A | * | 5/1999 | Tanaka et al. ............... | 370/469 |
| 7,065,367 B2 | * | 6/2006 | Michaelis et al. ......... | 455/452.2 |
| 7,110,371 B2 | * | 9/2006 | Monroe et al. ........... | 370/310.2 |
| 2004/0109472 A1 | * | 6/2004 | Choyi et al. ................. | 370/466 |
| 2004/0204076 A1 | * | 10/2004 | Kotzin ........................ | 455/577 |
| 2005/0198257 A1 | * | 9/2005 | Gupta et al. ................. | 709/224 |

FOREIGN PATENT DOCUMENTS

| | | |
|---|---|---|
| EP | 0 719 064 A2 | 6/1996 |
| EP | 0 998 096 A2 | 5/2000 |
| WO | WO 2004/032535 A2 | 4/2004 |
| WO | WO 2004/034724 A1 | 4/2004 |
| WO | WO 2004/047479 A2 | 6/2004 |

OTHER PUBLICATIONS

D. Johnson, et al., "Mobility Support in IPv6", IETF RFC3775, Jun. 2004, 331 pages.
C. Perkins, et al., "IP Mobility Support for IPv4", IETF RFC3220, Jan. 2002, 197 pages.
Ryuji Wakikawa, et al., "MIBsocket: An Integrated Mechanism to Manipulate General Network Information in Mobile Communications", IEICE Trans. Commun., vol. E.84-B, No. 8, Aug. 2001, pp. 2001-2010.

* cited by examiner

Primary Examiner—Rafael Perez-Gutierrez
Assistant Examiner—Gary Au
(74) Attorney, Agent, or Firm—Oblon, Spivak, McClelland, Maier & Neustadt, P.C.

(57) ABSTRACT

A mobile node having two or more interfaces, a control method of the mobile node, and a mobile node control program are disclosed. The mobile node includes a generating unit to generate control information for each interface, an information providing unit for providing the control information provided by each interface to an upper layer, and a routing controlling unit to perform at least one of determining connectivity, and updating a routing based on the provided control information.

12 Claims, 17 Drawing Sheets

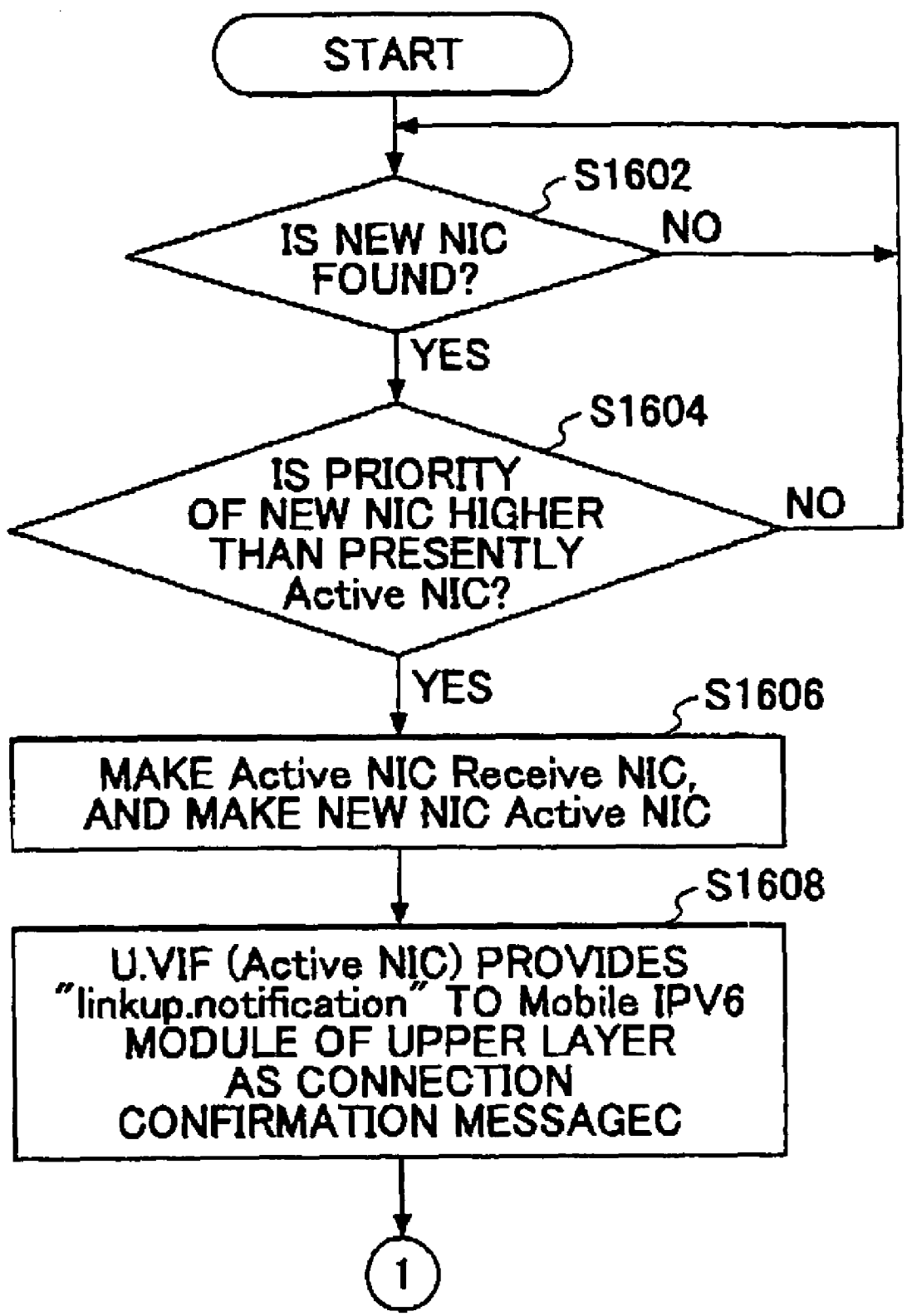

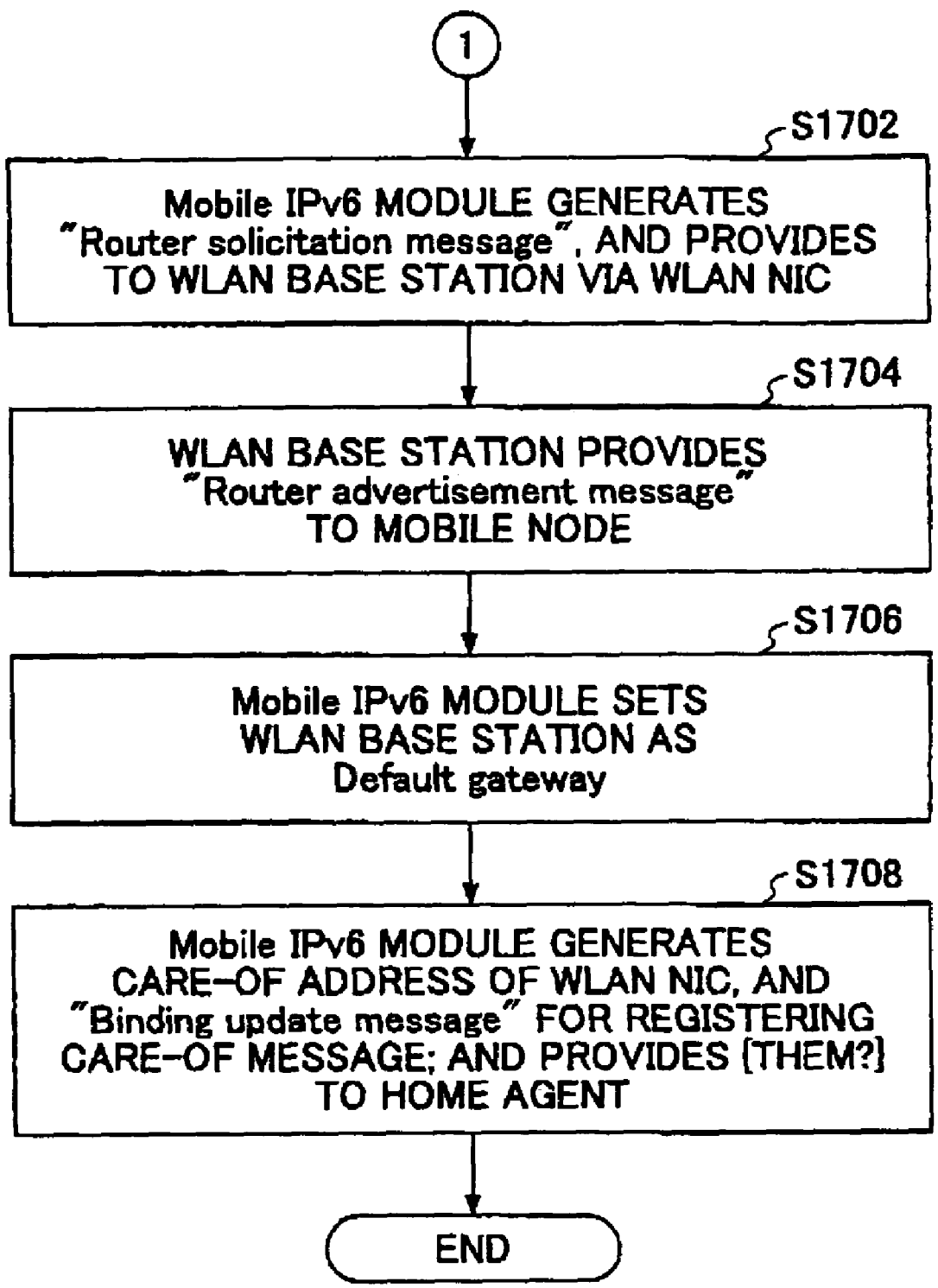

US 7,496,084 B2

MOBILE NODE, A CONTROL METHOD THEREOF, AND A MOBILE NODE CONTROL PROGRAM

BACKGROUND OF THE INVENTION

1. Field of the Invention

The present invention relates to a mobile node that includes two or more interfaces, and controls each interface; a control method of the mobile node, and a mobile node control program.

2. Description of the Related Art

With technology of communication systems including mobile communications advancing, various communication services are offered by different communication carriers. The communication services differ in service areas and communication costs. It is possible for a user to carry a terminal capable of handling two or more interfaces, and select one of the interfaces according to the situation. Further, by progress of IP mobility control technology including a mobile IP, the user can enjoy communications being unconscious of each interface.

The mobile node using the mobile IP changes a NIC (network interface card) for different packet transmission and reception systems according to Movement detection or Move detection (for example, Non-Patent References 1 and 2).

[Non-Patent Reference 1] D. Johnson et al, "Mobility Support in IPv6", IETF RFC3775, June 2004.

[Non-Patent Reference 2] C. Perkins et al, "IP Mobility Support for IPv4", IETF RFC3220, Jan 2002.

[Non-Patent Reference 3] Ryuji WAKIKAWA, Keisuke UEHARA, Fumio TERAOKA, "MIBsocket: An Integrated Mechanism to Manipulate General Network Information in Mobile Communications", IEICE TRANS. COMMUN., Vol. E84 B, No August 2001.

DESCRIPTION OF THE INVENTION

[Problem(s) to be Solved by the Invention]

However, there are the following problems in the background technology described above.

Communication interfaces have to be manually changed.

Further, even if the communication interfaces can be automatically changed, it only determines a transmitting/receiving interface of a data packet with reference to a circuit state provided by a link layer, and there remains a problem that no special process is performed as for an interface other than the determined interface.

In the case as described above, it is troublesome to manually change the communication interface; and where a mobile node is equipped with a number of interfaces, power-saving control of an unselected interface is indispensable. From the viewpoint of power saving, functions of the unselected interface should be turned off even if the mobile node is present in a link-able service area, and when a connection is available.

Further, in the mobile node using the mobile IP, since the NIC for transmission and reception of a packet is changed when connectivity of a link is lost, there is a problem in that the communications are temporarily lost. That is, although the mobile IP has a function of detecting that a radio wave from a base station, with which the communications have been carried out, is no longer being received, it is not capable of determining the availability of a new NIC and changing to the new NIC. For this reason, according to the conventional technology, the communications are interrupted from the detection of no radio wave until the change to the new NIC is completed.

The problem with the conventional mobile node is described with reference to an example conventional system shown in FIG. 1.

The example of the conventional system includes a communication network 1, to which a cellular base station 2 and a WLAN base station 3 are connected, and a mobile node 4 equipped with an NIC of cellular and an NIC of WLAN. The description that follows is about the case wherein the mobile node 4 moves into the service area of the WLAN base station 3 from the service area of the cellular base station 2. Here, a part of the service area of the cellular base station 2 and a part of the service area of the WLAN base station 3 overlap. Accordingly, with reference to FIG. 1, Point A is served by the cellular base station 2; Points B, C, and D can be served by the cellular base station 2 and the WLAN base station 3 overlapping; and Point E is served by the WLAN base station 3.

In this case, while the mobile node 4 moves from Point A to Point D, it is served by the cellular base station 2, not changing the link to the WLAN base station 3; and when moving to Point E from Point D, the link to the cellular base station 2 is lost.

Then, the mobile node 4 receives a Router Advertisement Message of the link of the WLAN, and starts using the link of the WLAN.

For this reason, communication is interrupted until the link to the WLAN is established after passing Point D.

SUMMARY OF THE INVENTION

It is a general object of the present invention to provide a mobile node, a control method thereof, and a mobile node control program that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a mobile node, a control method thereof, and a mobile node control program particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Further, other purposes of the present invention aim at offering a mobile node, a control method thereof, and a mobile node control program, whereby communications interruption due to losing a link is avoided.

[Means for Solving the Problem]

In order to solve the above-described object, the mobile node of the present invention equipped with two or more interfaces includes a generating unit for generating control information of each interface, an information providing unit for providing the control information provided by each interface to an upper layer, and a routing controlling unit for performing at least one of determining connection availability (connectivity), and updating a route, based on the provided control information.

By structuring the mobile node as above, a suitable interface can be automatically selected. Further, the communications can be controlled such that there is no communication interruption.

The control method of the mobile node having two or more interfaces according to the present invention includes a step of generating the control information of each interface, a step of receiving the control information provided by each interface, a step of reporting the control information to the upper layer, and a step of performing at least one of determining connection availability and updating of a route based on the provided control information.

According to the process described above, the mobile node can be controlled such that a suitable interface is automatically selected. Further, it is controllable so that the interruption of the communications does not arise.

The present invention further provides a mobile node control program for a mobile node equipped with two or more interfaces to function as the generating unit for generating the control information of each interface, an exchanging unit for exchanging the control information with the interfaces, an extracting unit for extracting attribute information of the interface from the control information, a storage unit for storing the attribute information, a selecting unit for selecting an interface that has the attribute that suits predetermined conditions, and the information providing unit for providing the control information provided by each interface to the upper layer.

In this way, the mobile node is made capable of automatically selecting a suitable interface.

[Effect of the Invention]

According to the present invention, the mobile node, the control method of the mobile node, and the mobile node control program that can automatically select a suitable interface are realized.

Further, the present invention provides the mobile node, the control method of the mobile node, and the mobile node control program that realize communications without link disconnection.

BRIEF DESCRIPTION OF THE DRAWINGS

FIG. 16 is a flowchart showing an operation of the mobile node according to the embodiment of the present invention; and FIG. 17 is the flowchart showing an operation of the mobile node according to the embodiment of the present invention.

DESCRIPTION OF THE PREFERRED EMBODIMENTS

In the following, embodiments of the present invention are described with reference to the accompanying drawings.

Here, as for the drawings for describing the embodiments, the same reference numbers are associated with the same functional units, and explanations thereof are not repeated.

A mobile communications system according to the embodiment of the present invention is an IP based mobile communications system that employs various kinds of link layer technologies including the fourth generation cellular communication system radio access, and component engineering technology such as IP mobility control that realize end-to-end accessibility of an IP packet in an IP layer. As for the link layer technologies, two or more link layer technologies are used, including HSDPA (High Speed Downlink Packet Access), wireless LAN, and advanced fourth generation cellular communication systems radio access. As for IP mobility control, improved hierarchical MobileIP (HMIP-B), MobileIP (MIP), and FMIP that is an extended method of the Mobile IP are used.

Figure 3:
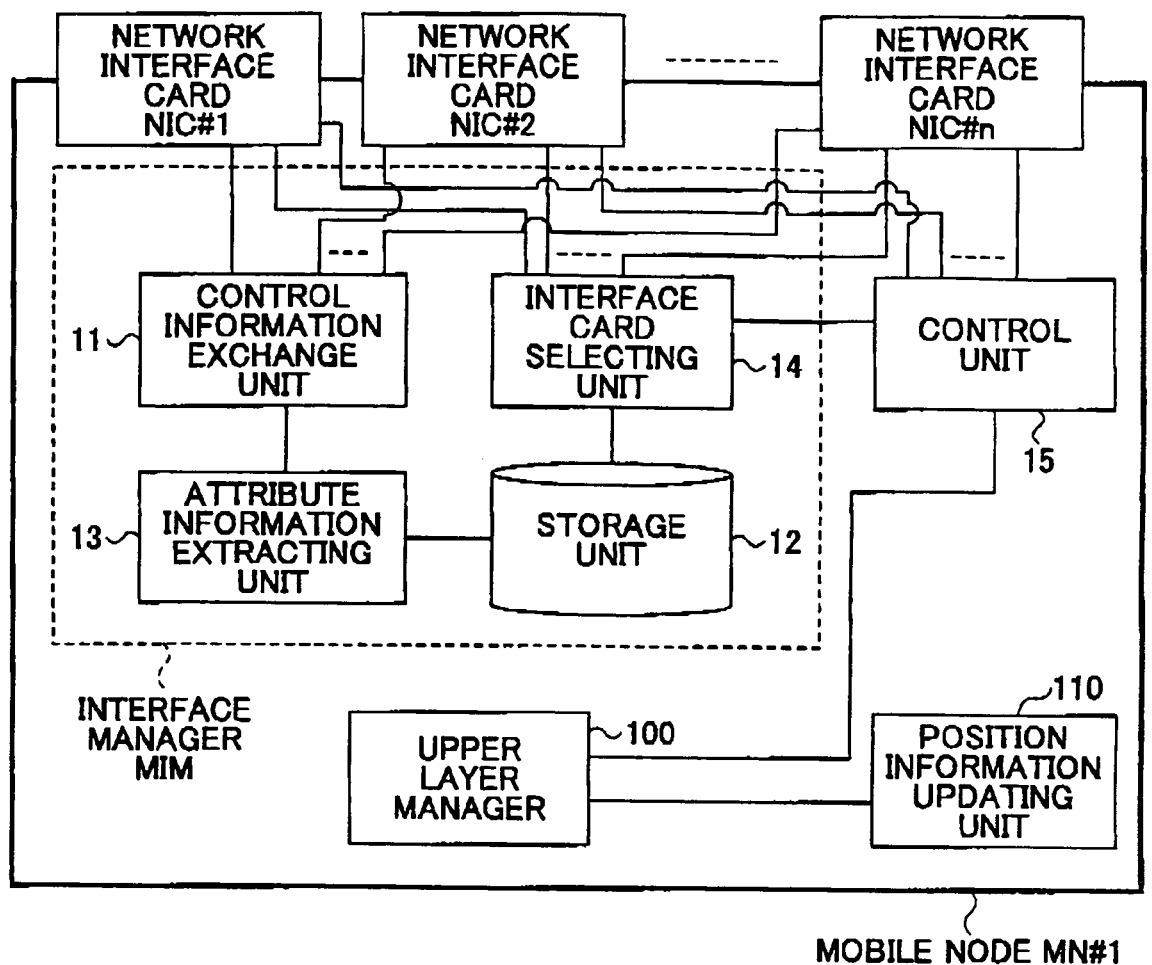
FIG. 3 is a functional block diagram of the mobile node according to the embodiment of the present invention.
Figure 4:
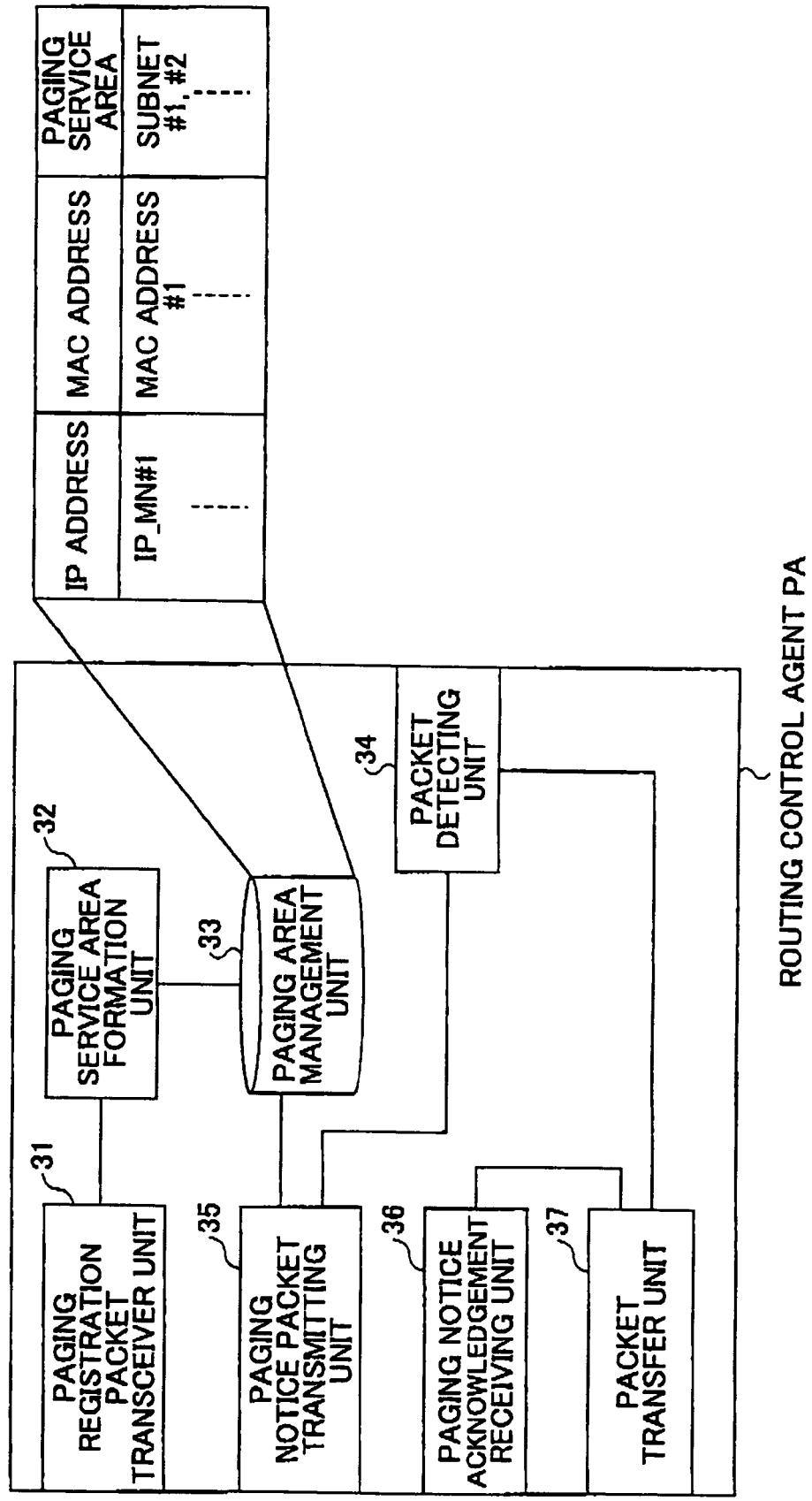
FIG. 4 is a functional block diagram of a routing control agent according to the embodiment of the present invention.

In the embodiment, in order to describe the mobile communications system, a paging activity in a paging control mode, and a hand-off operation in a normal mode are described as examples, The mobile communications system according to the embodiment of the present invention is described with reference to FIGS. 2 through 4.

Figure 1:
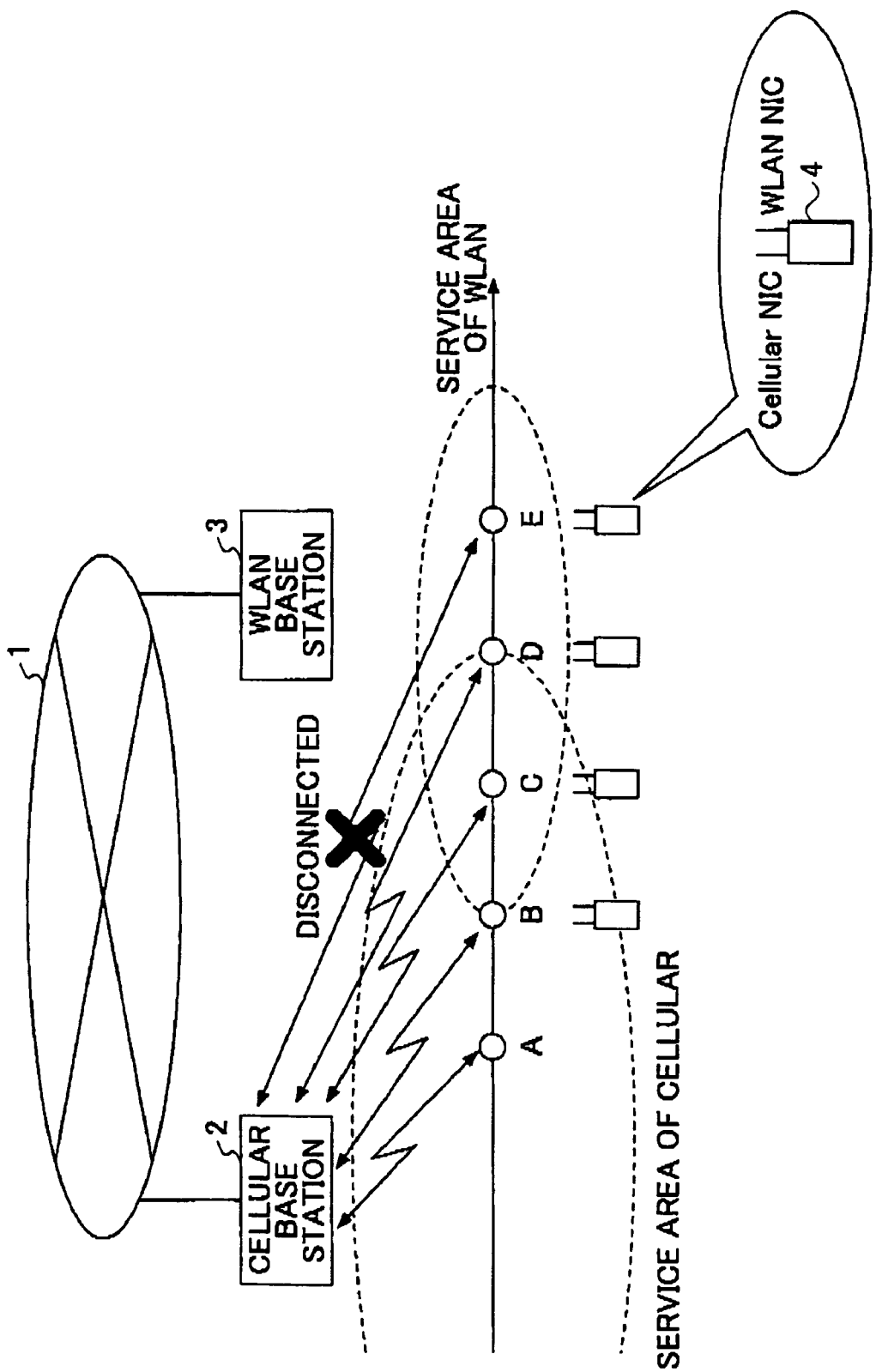
FIG. 1 is a network diagram showing an operation of a mobile node that moves between different systems.
Figure 2:
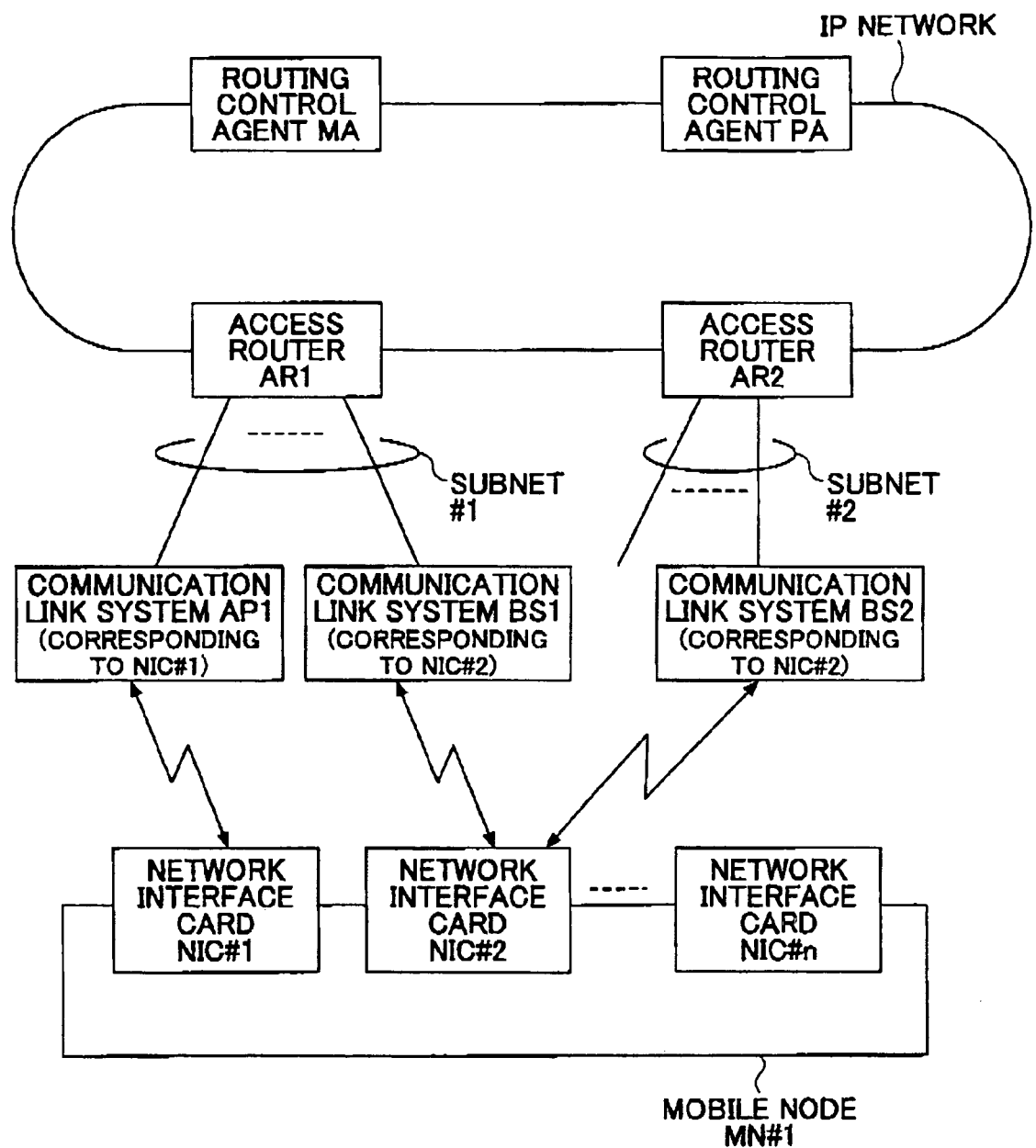
FIG. 2 is a block diagram of a mobile communications system according to an embodiment of the present invention.

With reference to FIG. 2, the mobile communications system according to the embodiment includes routing control agents MA and PA, access routers AR1 and AR2, communication link systems AP1 and BS1 connected to the access router AR1, a communication link system BS2 connected to the access router AR2, and a mobile node MN#1 that can be connected to the communication link systems AP1, BS1, and BS2. The routing control agents MA and PA and the access routers AR1 and AR2 are connected by an IP network.

According to the mobile communications system of the embodiment, when the routing control agent PA receives a packet addressed to the mobile node MN#1, such as a mobile terminal, position information (subnet) of the mobile node MN#1 is acquired, and the destination of the packet is determined by transmitting a paging notice packet to a paging service area of the mobile node MN#1.

Next, the mobile node MN#1 is described with reference to FIG. 3.

The mobile node MN#1 is connected to the IP network by one of the network interface cards NIC#1 through NIC#n (n is a positive integer) via the communication link system and the access router AR.

The mobile node MN#1 includes network interface cards NIC#1 through NIC#n, a multiple interface manager MIM (hereafter called the interface manager) connected to the network interface cards NIC#1 through NIC#n, a control unit 15 connected to the network interface cards NIC#1 through NIC#n and the interface manager MIM, an upper layer manager 100 connected to the control unit 15, and a position information updating unit 110 connected to the upper layer manager 100.

The upper layer manager 100 and the position information updating unit 110 constitute a routing control unit.

The interface manager MIM selects a suitable NIC out of the NICs using the link layer information according to Preference that defines use priority, and realizes a seamless handoff between different link layer technologies, taking power-saving into consideration.

The interface manager MIM includes a control information exchange unit 11 connected to the network interface cards NIC#1 through NIC#n, an attribute information extraction unit 13 connected to the control information exchange unit 11, a storage unit 12 connected to the attribute information extraction unit 13, and an interface-card selection unit 14 connected to the storage unit 12, the network interface cards NIC#1 through NIC#n, and the control unit 15.

A MAC address (Media Access Control address, a link layer address) is set to each of the network interface cards NIC#1 through NIC#n. The network interface card NIC#1 is for connecting to the communication link system AP1, and the network interface card NIC#2 is for connecting to the communication link systems BS1 and BS2.

The control information exchange unit 11 generates the control information of each network interface card, and exchanges the control information with the network interface cards NIC#1 through NIC#n. The attribute information extraction unit 13 extracts the attribute information of the network interface cards from the control information exchanged with the control information exchange unit 11. The extracted attribute information contains priority information such as information about a kind of available communication link system, communication cost, a measured power magnitude, user preference, and use situation such as the business use.

The storage unit 12 stores the attribute information extracted by the attribute information extraction unit 13. Further, the storage unit 12 stores a mobile node control program. The mobile node control program generates the control information of each interface of the mobile node MN#1, and selects an interface that has the attribute that suits predetermined conditions in collaboration with the control information exchange unit 11 that exchanges the control information with the interfaces, and the attribute information extraction unit 13 that extracts the attribute information of the interface from the control information and causes the storage unit 12 to store the extracted attribute information. The mobile node control program further causes the interface-card selection-unit 14 to provide the control information received from each interface to the upper layer. The interface-card selection unit 14 selects the network interface card that has the attribute that suits the predetermined conditions. For example, Preference that defines the connection priority of a network interface card NIC is prepared, and a network interface card NIC is selected based on Preference.

The control unit 15 operates the mobile node MN#1 according to modes of operation, for example, the normal mode and the paging control mode. When operating under the normal mode, the mobile node MN#1 performs a mobility management operation as directed by the control unit 15 using Mobile IP, or its extended technology. When operating under the paging control mode, as directed by the control unit 15, the mobile node MN#1 stops the mobility management operation, and transmits a paging registration packet for forming a paging service area to the routing control agent PA.

The upper layer manager 100 performs control, for example, in the network layer that is a layer higher than the link layer. For example, the upper layer manager 100, in collaboration with the routing control agent MA, if needed, performs control in the IP layer, and realizes transmission/reception of an IP packet. Further, the upper layer manager 100 transmits the paging registration packet for forming the paging service area of the mobile node MN#1 to the routing control agent PA. An IP address and a Media Access Control Address may be contained in the paging registration packet. Further, the upper layer manager 100 performs address solution using the Media Access Control Address, and a predetermined IP address (Network layer address).

The position information updating unit 110 determines the connectivity, and updates the route according to an instruction of the upper layer manager 100. For example, an updating process of a default gateway is performed.

Next, the routing control agent PA is described with reference to FIG. 4.

The routing control agent PA includes a paging registration packet transceiver unit 31, a paging service area formation unit 32 connected to the paging registration packet transceiver unit 31, a paging service area management unit 33 connected to the paging service area formation unit 32, a paging notice packet transmitting unit 35 connected to the paging service area management unit 33, a packet detecting unit 34 connected to the paging notice packet transmitting unit 35, a packet transfer unit 37 connected to the packet detecting unit 34, and a paging notice acknowledgement receiving unit 36 connected to the packet transfer unit 37.

The paging registration packet transceiver unit 31 receives the paging registration packet for forming the paging service area of the mobile node MN#1 transmitted from the mobile node MN#1, and inputs it to the paging service area formation unit 32. Further, the paging registration packet transceiver unit 31 receives the Media Access Control Address corresponding to the determined network interface card NIC from the mobile node MN#1. Further, the paging registration packet transceiver unit 31 transmits a paging registration response packet that reports that the paging service area has been formed to the mobile node MN#1 through the access router AR1, the communication link system AP1, the network interface card NIC#1, and the interface manager MIM.

The paging service area formation unit 32 forms the paging service area of the mobile node MN#1 based on the paging registration packet. For example, the paging service area formation unit 32 sets the paging service area of the mobile node MN#1 to subnets #1 and #2 based on the information showing the subnet contained in the paging registration packet.

The paging service area management unit 33 manages the paging service area of the mobile node MN#1, and stores, for example, "IP address", "Media Access Control Address", and "Paging service area" being associated. For example, the paging service area management unit 33 manages "IP_MN#1" as the IP address, "Media Access Control Address #1" as the Media Access Control Address, and "Subnets #1 and #2" as the paging service area. That is, the paging service area management unit 33 manages the paging service area of the mobile node MN#1 based on the IP address currently assigned to the mobile node MN#1 "IP_MN#1", and the received Media Access Control Address "Media Access Control Address #1".

The packet detecting unit 34 detects and buffers the IP packet addressed to the mobile node MN#1, and communicates that effect to the paging notice packet transmitting unit 35. Further, the packet detecting unit 34 transmits the buffered IP packet addressed to the mobile node MN#1 according to directions of the packet transfer unit 37.

The paging notice packet transmitting unit 35 transmits the paging notice packet to the subnets #1 and #2 that constitute the paging service area of the mobile node MN#1 according to the notice from the packet detecting unit 34.

The paging notice acknowledgement receiving unit 36 receives a paging notice acknowledgement packet transmitted from the mobile node MN#1, and communicates that effect to the packet transfer unit 37.

The packet transfer unit 37 extracts an IP packet corresponding to the paging notice acknowledgement packet that is received from the packet detecting unit 34, and transmits the extracted IP packet based on the subnet of the mobile node MN#1 contained in the paging notice acknowledgement packet.

The access routers AR1 and AR2 perform a routing process based on the IP address. For example, the access router AR1 performs the routing process of the subnet #1 linked to the communication link systems AP1 and BS1. Further, the access router AR2 performs the routing process of the subnet #2 linked to the communication link system BS2.

The communication link systems AP1, BS1, and BS2 are connected to the corresponding access routers AR1 and AR2, and perform transfer control in the link layer based on the Media Access Control Address.

According to the mobile communications system of the embodiment of the present invention, no functional additions are required of the communication link systems (access points) AP1, BS1, and BS2 that are the network nodes, the access routers AR1 and AR2, and other controlling units.

Figure 5:
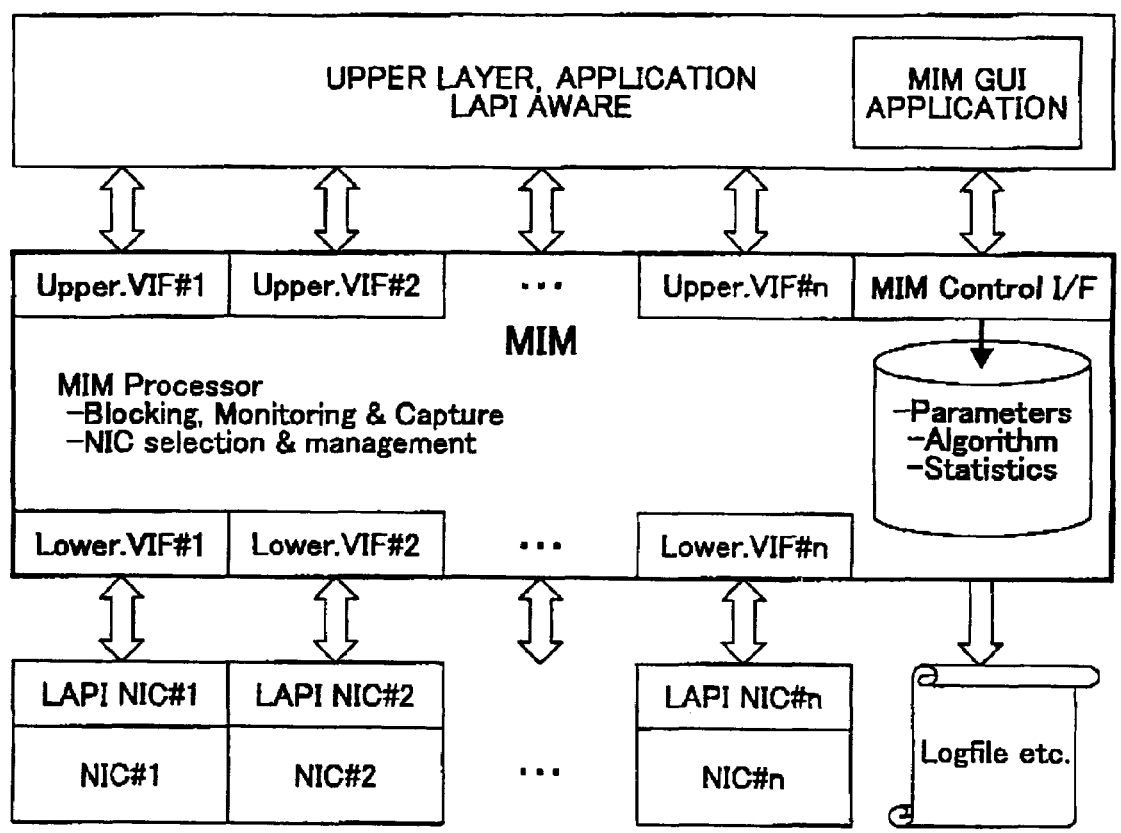
FIG. 5 is a functional block diagram of an interface manager according to the embodiment of the present invention.

Next, the logical structure of the interface manager MIM of the mobile node MN#1 is described with reference to FIG. 5.

The interface manager MIM is located immediately above the link layer in the protocol stack of the mobile node MN#1, and is hidden from the protocol of the upper layer and application.

The upper layer exchanges the control information and packets with a control information exchange API, e.g. LAPI (Link Layer application programming interface), corresponding to each network interface card NIC. Here, LAPI is an API defined in order to make the control information of each link layer uniform, and to exchange control information with the upper layer, which LAPI accelerates the control of application and various protocols located in a layer higher than the link layer, raising the communication quality. As the control information exchange API, MIBsocket is known (for example, Non-Patent Reference 3).

The interface manager MIM includes Virtual Interface (VIF), Processor, and Control Interface (Control I/F).

Virtual Interface (VIF) is a virtual interface that the interface manager MIM holds, and includes two kinds, namely, Upper.VIF (U. VIF) that is recognized as each NIC by the upper layer, and Lower.VIF (L. VIF) that is recognized as the upper layer by the NIC. The interface manager MIM exchanges the control information between the upper layer and a lower layer, in the protocol stack of the mobile node MN#1 through Virtual Interfaces. For example, the interface manager MIM includes Upper.VIF#1 through Upper.VIF#n, and Lower.VIF#1 through Lower.VIF#n (n is a positive integer). Upper.VIF#1 through Upper.VIF#n exchange the control information with the upper layer. The Lower.VIF#1 through Lower.VIF#n exchange the control information with the network interface cards NIC#1 through NIC#n through LAPI NIC#1 through LAPI NIC#n, respectively.

Processor is an execution module that selects an optimal NIC. Processor generates Preference that defines the connection priority of the network interface card NIC according to a parameter and selection algorithm that is set up by Control Interface described later, and selects and manages the NIC according to Preference. Further, Processor exchanges, issues, and intercepts the control information, while managing a timer required for the control. Furthermore, Processor may be configured to perform buffering and discarding of not only the control information but also a data packet, and allocation of an I/O NIC.

Control Interface (Control I/F) enables the input of a parameter, an algorithm, etc., required for generation of Preference, and the change of the NICs. Further, it also includes an interface that provides information management such as a log output.

Next, states of the network interface card NIC that the interface manager MIM manages are described. As the states of the network interface card NIC, three cases are assumed, namely, Active VIC, Receive NIC, and Low Power NIC.

Active NIC is a state wherein a data packet is transmitted and received. In this state, the control information is transmitted as it is.

Receive NIC is a state wherein turning off of an old Active NIC is postponed in order that the upper layer establishes a connection with a new Active NIC, when changing a NIC, i.e., Active NIC. In Receive NIC, a data packet is received; however, the control information is discarded.

Low Power NIC is a state wherein power-saving control is performed, and the function is turned off. This is the state of a NIC other than Active NIC and Receive NIC. In this state, the link layer control of the interface is not performed, and a data packet is neither transmitted nor received.

Figure 6:
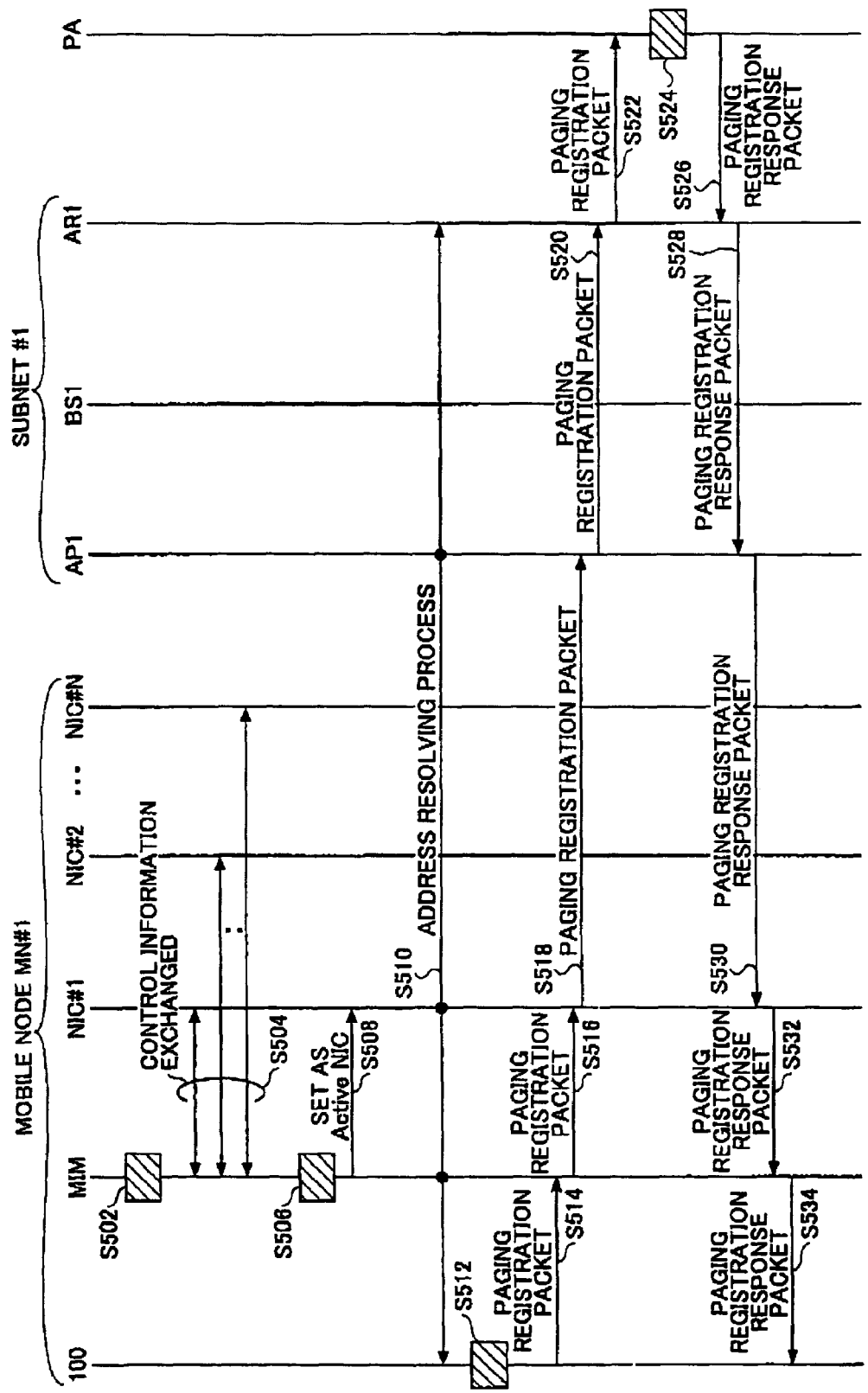
FIG. 6 is a flowchart showing an operation of the mobile communications system according to the embodiment of the present invention.
Figure 7:
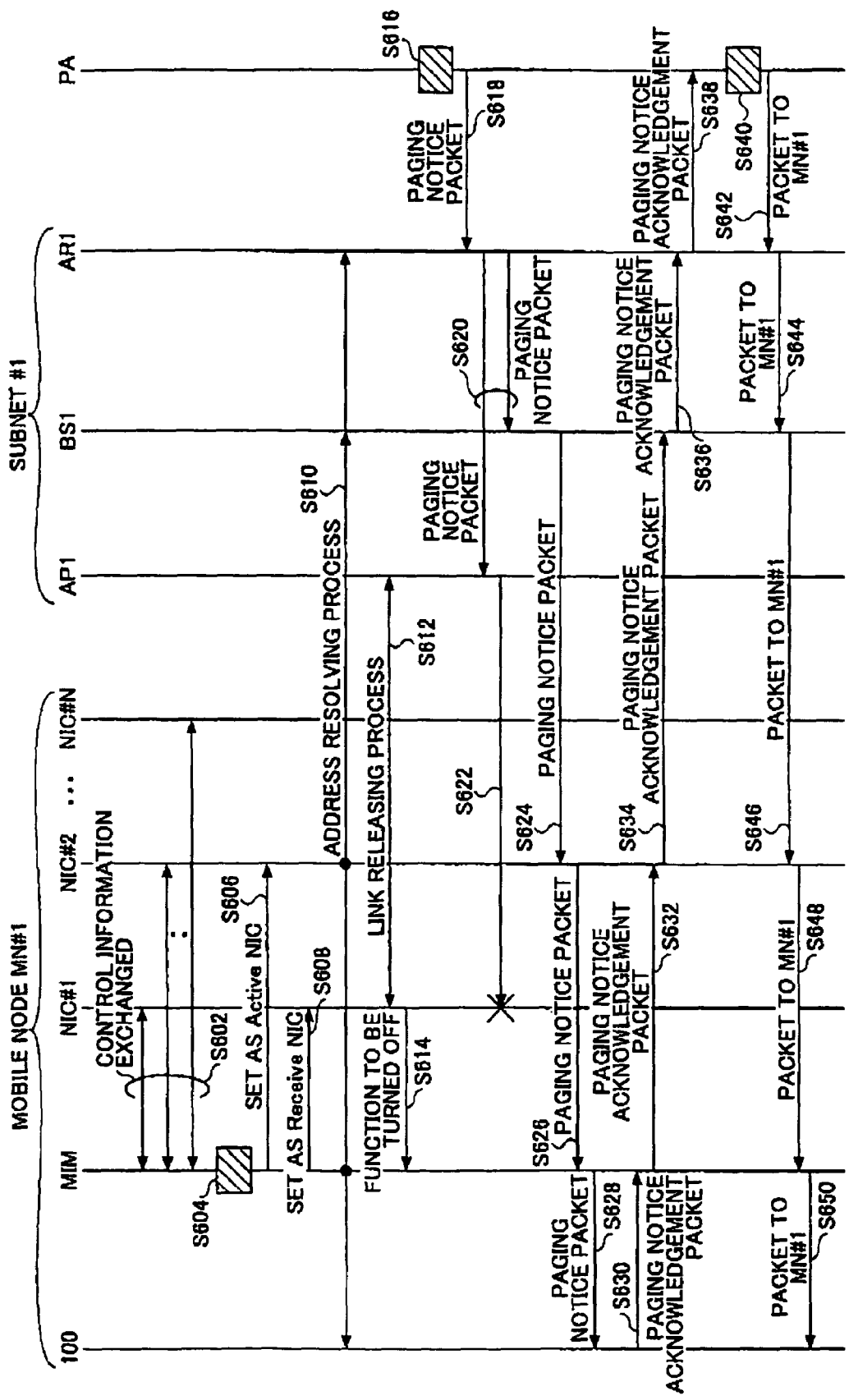
FIG. 7 is a flowchart showing an operation of the mobile communications system according to the embodiment of the present invention.

Next, operations of the mobile communications system according to the embodiment are described with reference to FIG. 6 and FIG. 7.

One of the following events takes place, namely, the power supply of the mobile node MN#1 is turned on, and a network interface card NIC is extended by the mobile node MN#1 (Step S502).

The control information exchange unit 11 generates the control information for each network interface card, and exchanges the control information with the network interface cards NIC#1 through NIC#n (Step S504). The attribute information extraction unit 13 extracts the attribute information of the interface cards NIC#1 through NIC#n from the exchanged control information, and stores the attribute information in the storage unit 12. The interface-card selection unit 14 selects an interface card that has the suitable attribute, for example, the network interface card NIC#1, based on predetermined conditions, for example, Preference (Step S506), and sets the selected network interface card as Active NIC (Step S508).

Next, the upper layer manager 100 performs an address solution process with the access router AR1 via the interface manager MIM, the network interface card NIC#1, and the communication link system AP1 using the Media Access Control Address and the predetermined IF address of the network interface card #1 (Step S510).

Next, the control unit 15 starts operations under the paging control mode (Step S512).

Next, the upper layer manager 100 transmits the paging registration packet containing the Media Access Control Address and the predetermined IP address of the network interface card #1 to the routing control agent PA via the interface manager MIM, the network interface card NIC#1, the communication link system API, and the access router AR1 (Step S514 through Step S522).

Next, the paging service area formation unit 32 forms the paging service area related to the Media Access Control Address and the predetermined IP address of the network interface card #1, for example, the subnets #1 and #2, based on the paging registration packet that is received (Step S524).

Next, the paging registration packet transceiver unit 31 transmits the paging registration response packet signaling that the paging service area has been formed to the upper layer manager 100 of the mobile node MN#1 using the Media Access Control Address and the IP address via the access router AR1, the communication link system AP1, the network interface card NIC#1, and the interface manager MIM (Step S526 through Step S534).

Next, the case where the interface manager MIM selects a suitable NIC out of the network interface cards NIC#1 through NIC#n according to Preference, taking power-saving into consideration using the link layer information, is described with reference to FIG. 7.

The control information exchange unit 11 generates the control information of each network interface card, and exchanges the control information with the network interface cards NIC#1 through NIC#n (Step S602).

The attribute information extraction unit 13 extracts the attribute information of the network interface cards NIC#1 through NIC#n from the exchanged control information, and stores the attribute information in the storage unit 12.

The interface-card selection unit 14 selects an interface card that has the suitable attribute that suits predetermined conditions based on Preference, for example, the network interface card #2 is selected (Step S604). The selected network interface card is set as Active NIC (Step S606), and the network interface card NIC#1 that has been set as Active NIC is now set as Receive NIC (Step S608).

Next, the upper layer manager 100 performs an address solution process with the access router AR1 via the interface manager MIM, the network interface card NIC#2, and the communication link system BS1 using the Media Access Control Address and the predetermined IP address of the network interface card #2 (Step S610).

Next, the network interface card NIC#1 releases the communication link to the communication link system AP1 using the Media Access Control Address that is set up (Step S612), and notifies the interface manager MIM that the operation is stopped (Step S614).

The packet detecting unit 34 of the routing control agent PA receives the packet addressed to the mobile node MN#1 (Step S616). Then, the paging notice packet transmitting unit 35 transmits the paging notice packet to the access router AR1, signaling that the packet addressed to the mobile node MN#1 is received (Step S618).

The access router AR1 transmits the paging notice packet to the communication link systems AP1 and BS1 that manage the paging service area of the mobile node MN#1, i.e., the subnet #1 and #2 (Step S620).

The communication link systems AP1 and BS1 transmit the above-described paging notice packet to the network interface cards NIC#1 and #2, respectively, using the Media Access Control Address and the IP address (Step S622 and Step S624). The paging notice packet transmitted to the network interface card NIC#1 is not received (Step S622). The paging notice packet received by the network interface card NIC#2 is transmitted to the upper layer manager 100 (Step 9626 and Step S628).

Next, the upper layer manager 100 transmits the paging notice acknowledgement packet responding to the paging notice packet to the routing control agent PA using the Media Access Control Address and the IP address via the interface manager MIM, the network interface card NIC#2, the communication link system BS1, and the access router AR1 (Step S630 through Step S638).

Next, the packet transfer unit 37 extracts the packet addressed to the mobile node MN#1 buffered in the packet detecting unit 34 according to the paging notice acknowledgement packet that is received (Step S640).

Next, the packet transfer unit 37 transmits the packet addressed to the mobile node MN#1 to the upper layer manager 100 using the Media Access Control Address and the IP address via the access router AR1, the communication link system BS1, the network interface card NIC#2, and the interface manager MIM (Step S642 through Step S650).

Next, the selection process of the network interface card NIC that the interface manager MIM performs is described with reference to FIGS. 8 through 11.

Here, the case where LAPI serves as the control information exchange API is described, wherein the link layer transmits the control information between higher-order protocols. The description is also applicable to the case where another control information exchange API is used.

First, the control information to be used is described.

According to the present embodiment,

"linkup.notification/request",

"poweroff.notification/request",

"linkdown/predown.notification", and

"Active/Dormant.request" are used.

The "linkup.notification/request" is control information that notifies/requires that a network interface card be in a link-up state. The linkup state is a state wherein communications of the link layer are established, and a packet of the upper layer can be transmitted and received.

The "poweroff.notification/request" is control information that notifies/requires that the power consumption of the network interface card be in the lowest state. Although exchange of the control information is enabled, it is the state wherein no communications in the link layer are performed, major portion of its functions being disabled.

The "linkdown/predown.notification" is control information that provides notification that the network interface card NIC is in a linkdown state or in a state that is almost linkdown. The linkdown state is a state wherein transmission and reception of the packet of the upper layer cannot be performed, because the terminal is outside of the service area, and the like.

The "Active/Dormant.request" is control information indicating that the upper layer requires the change of Preference, indicating whether the IP layer service is in Active or Dormant mode. Dormant mode is the operating state of IP paging, wherein the IP layer stand-by is defined.

First, the case wherein a reselection is performed according to change of the attribute of the network interface card is described with reference to FIG. 8.

Figure 8:
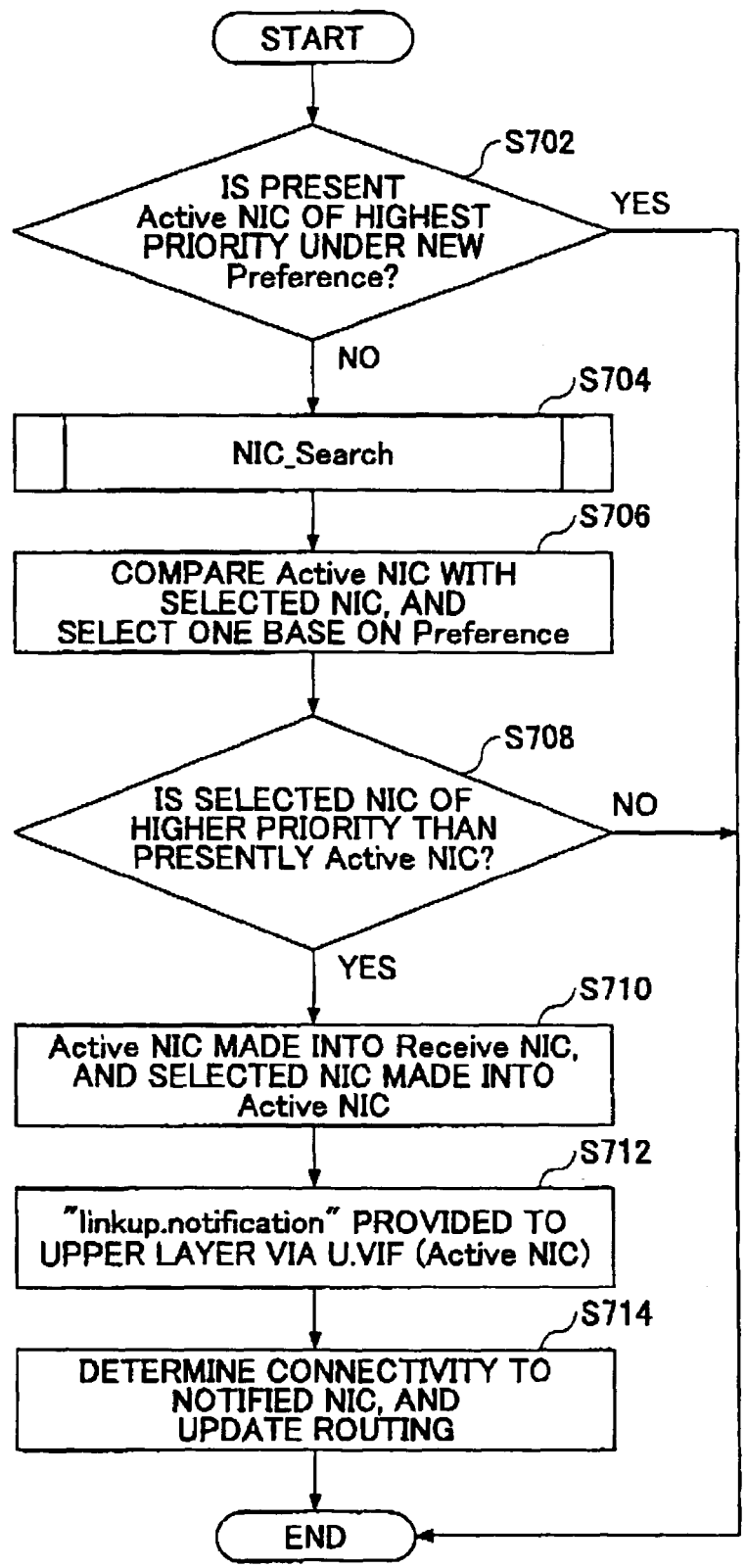
FIG. 8 is a flowchart showing an operation of the interface manager according to the embodiment of the present invention.

FIG. 8 is a flowchart of the operations of the interface manager MIM when the upper layer generates the control information accompanied by change of Preference. The cases wherein the upper layer generates the control information accompanied by change of Preference includes the case wherein a communication state transitions to a stand-by state, the user changes Preference according the user preference concerning cost and access technology, and a change of Preference is required according to application to execute, First, the interface-card selection unit 14 determines whether the presently Active NIC is the most preferred NIC based on Preference (Step S702). If it is determined that the presently Active NIC is not the most preferred NIC (NO at Step S702), a NIC search process described later is performed (Step S704). If the presently Active NIC is the most preferred NIC (YES at Step S702), the process is finished.

The interface-card selection unit 14 determines that the Active NIC has not become unavailable during the NIC Search process by Flag, compares a NIC selected by Search with the presently Active NIC, and selects one of them based on Preference (Step S706).

Next, the interface-card selection unit 14 determines if the selected NIC has priority higher than the presently Active NIC (Step S708). If the determination is positive (YES at Step S708), the presently Active NIC is set as Receive NIC, and the selected NIC is set as Active NIC (Step S710).

Otherwise, if the determination is negative (NO at Step 3708), the process is finished.

Next, the "linkup.notification" is provided to the upper layer (upper than or equal to L3), for example, a layer 3 (L3), via the Upper.VIF corresponding to Active NIC (Step S712).

Next, the upper layer that receives the "linkup.notification" determines the connectivity to the NIC, and updates the route. For example, a hand-off process is performed (Step S714).

As described above, when the upper layer generates the control information accompanied by change of Preference, a suitable network interface card is automatically selected.

In order to determine whether Active NIC is available, Flag can be used as described above; in addition to this, the availability can be determined by the interface manager MIM determining the availability by transmitting control information arranged to determine the connection state to Active NIC, when a NIC has been selected in the NIC Search process.

The NIC that has been set as Active NIC until now is set as Receive NIC. Thus, since both Active NIC and Receive NIC are capable of receiving packets, the packet loss of the upper layer can be reduced. The interface-card selection unit 14 of the interface manager MIN transmits "poweroff.request" to Receive NIC after a time sufficient for the process to change the upper layer. Receive NIC that receives the "poweroff.request" turns OFF its function. The power consumption of un-selected interface(s) can be reduced in this way.

Figure 9:
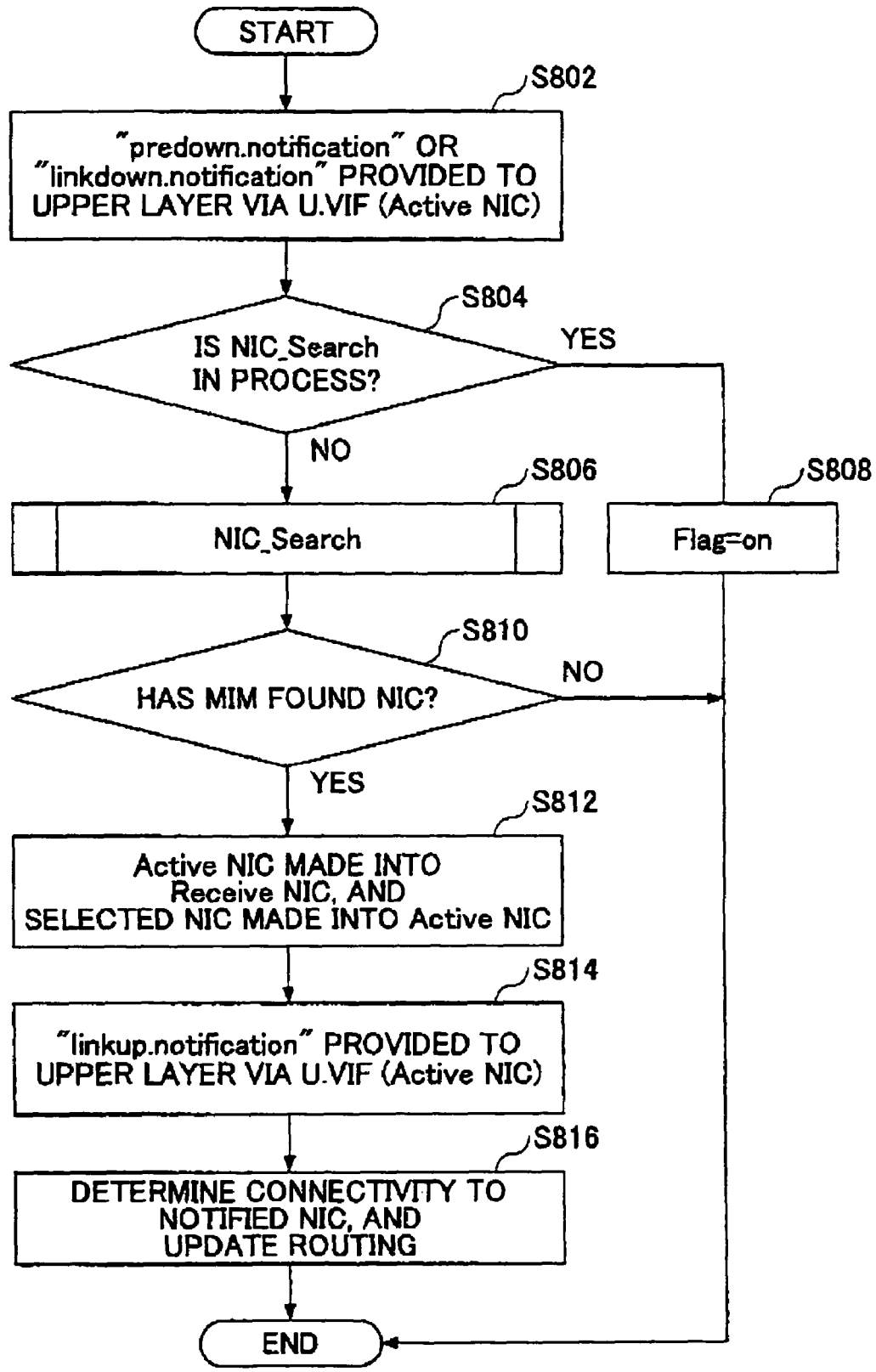
FIG. 9 is a flowchart showing an operation of the interface manager according to the embodiment of the present invention.

Next, operations of the interface manager MIM when Active NIC in use generates the control information purporting that continuation of the connection of a link layer is difficult is described with reference to FIG. 9.

Active NIC generates the control information purporting that the continuation of the connection of the link layer is difficult when events such as the terminal moving outside of the service area, the NIC being removed, and transmission quality being degraded by interference, occur.

First, Active NIC transmits "predown.notification" or "linkdown.notification" via Upper.VIF corresponding to Active NIC to the upper layer (upper than or equal to L3) (Step S802).

Next, the control information exchange unit 11 determines whether NIC Search is performed (Step S804). When NIC Search is performed (YES at Step S804), Flag is set to ON (Step S808), and the process is finished. In this way, when the NIC Search process is performed, the Flag can specify that Active NIC is not properly available, which can be reflected to the NIC Search process under execution.

On the other hand, when NIC Search is not performed (NO at Step S804), NIC Search as described later is performed (Step S806).

Next, it is determined whether the control information exchange unit 11 of the interface manager MIM has found an interface card NIC (Step S810). If the determination is affirmative (YES at Step 810), the interface-card selection unit 14 sets the presently Active NIC as Receive NIC, and set the newly selected NIC as Active NIC (Step S812). When the interface manager MIM does not find an interface card NIC (NO at Step 810), the process is finished.

Next, the interface-card selection unit 14 provides "linkup.notification" to the upper layer (upper than or equal to L3) via Upper.VIF corresponding to Active NIC (Step S814).

Next, the upper layer that received the "linkup.notification" determines the connectivity to the NIC, and updates the route. For example, a hand-off process is performed (Step S816).

In this way, when Active NIC in use generates the control information purporting that continuation of connection to the link layer is difficult, change to a suitable network interface card is automatically carried out.

Figure 10:
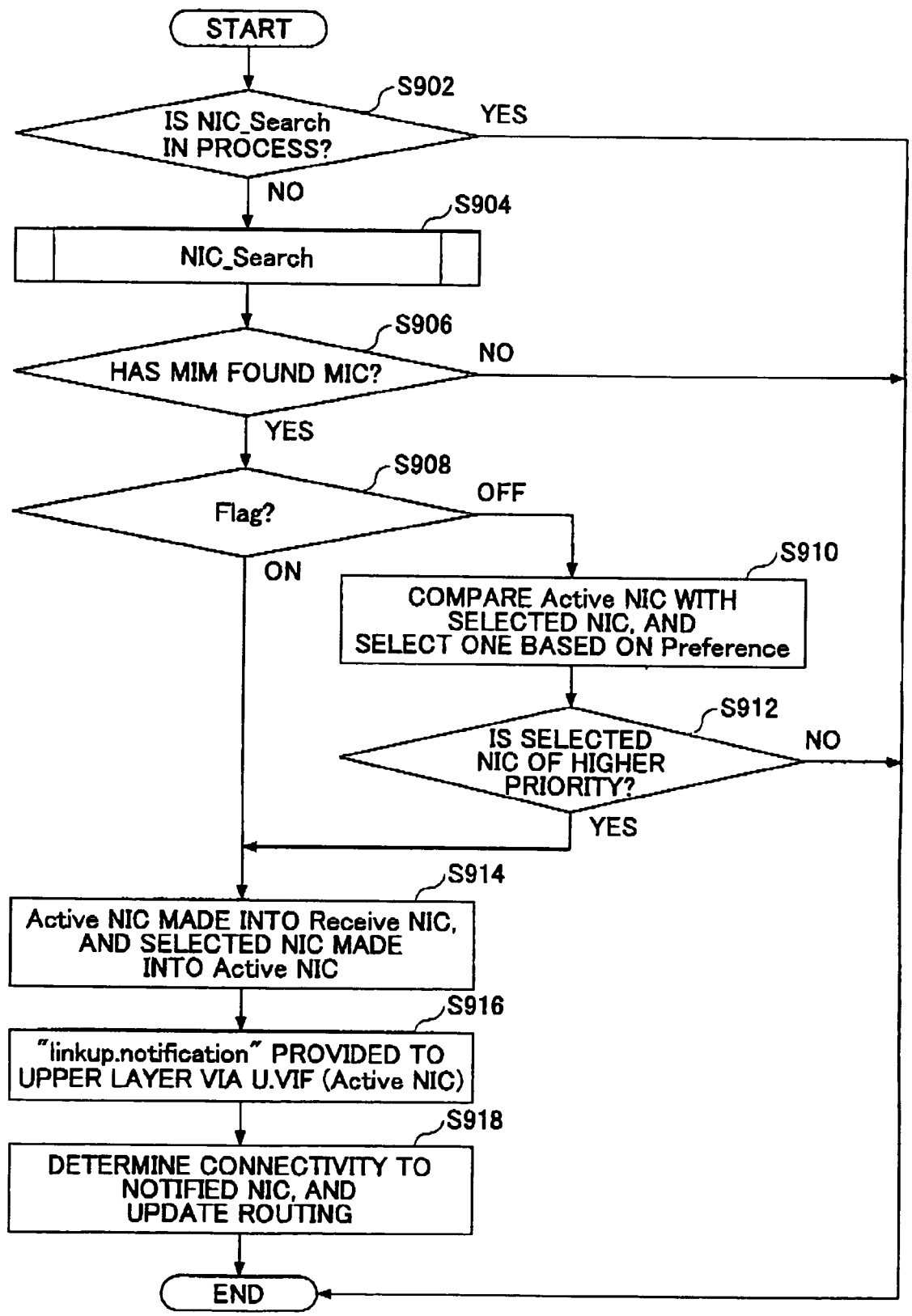
FIG. 10 is a flowchart showing an operation of the interface manager according to the embodiment of the present invention.

Next, operations of the interface manager MIM in the case of finding a NIC that is available, and has a priority higher than the presently Active NIC is described with reference to FIG. 10. When the presently Active NIC is not of the top priority, the interface manager MIM determines whether the NIC with the higher priority can be used by performing NIC Search at a Preference timer cycle. In this case, functions of NIC(S) other than Active NIC and Receive NIC are turned off by the interface manager MIM. In this manner, the NIC Search process is performed at an interval determined by the interface manager MIM so that whether the NIC(s) are available is determined.

First, the control information exchange unit 11 determines whether the interface-card selection unit 14 performs NIC Search (Step S902). If NIC Search is performed (YES at Step S902), the process is finished. Otherwise, if NIC Search is not performed (NO at Step S902), NIC Search described later is performed (Step S904).

Next, it is determined whether the control information exchange unit 11 of the interface manager MIM has found an interface card NIC (Step S906). When the control information exchange unit 11 does not find an interface card NIC, (NO at Step S906), the process is finished.

If the control information exchange unit 11 finds an interface card NIC (YES at Step 906), it is determined whether Flag is ON (Step S908). If Flag is OFF (OFF at Step S908), the interface-card selection unit 14 compares the presently Active NIC with the found NIC, i.e., selected NIC, and selects one based on Preference (Step S910). Next, the interface-card selection unit 14 determines whether the selected NIC has the high priority (Step S912). If the priority of the selected NIC is not higher (NO at Step S912), the process is finished.

If the priority of the selected NIC is higher (YES at Step S912), or if Flag is ON (ON at Step S908), the interface-card selection unit 14 sets the presently Active NIC as Receive NIC, and sets the selected NIC as Active NIC (Step S914).

Next, "linkup.notification" is provided to the upper layer (upper than or equal to L3) via Upper.VIF corresponding to Active NIC (Step S916).

Next, the upper layer that receives the "linkup.notification" determines the connectivity to the NIC, and updates the route. For example, a hand-off process is performed (Step S918).

Consequently, old Active NIC turns into Receive NIC. The interface-card selection unit 14 of the interface manager MIM transmits "poweroff.request" to Receive NIC after a time sufficient for the process of the upper layer to finish. Receive NIC that receives "poweroff.request" turns off its function.

In this way, when a NIC having priority that is higher than the presently Active NIC is found, change to the suitable network interface card is automatically carried out. Further, the power consumption of the unselected interface(s) can be reduced.

The cycle of the interface manager MIM performing the NIC Search process may be defined for every set of Preference. Further, the cycle may be adjusted according to the change history and use frequency of Active NIC.

The cases wherein a NIC with a priority higher than Active NIC becomes connectable include when a mobile node MN moves into the service area from outside, when the NIC is inserted and set to the terminal, and when communication quality is improved.

Figure 11:
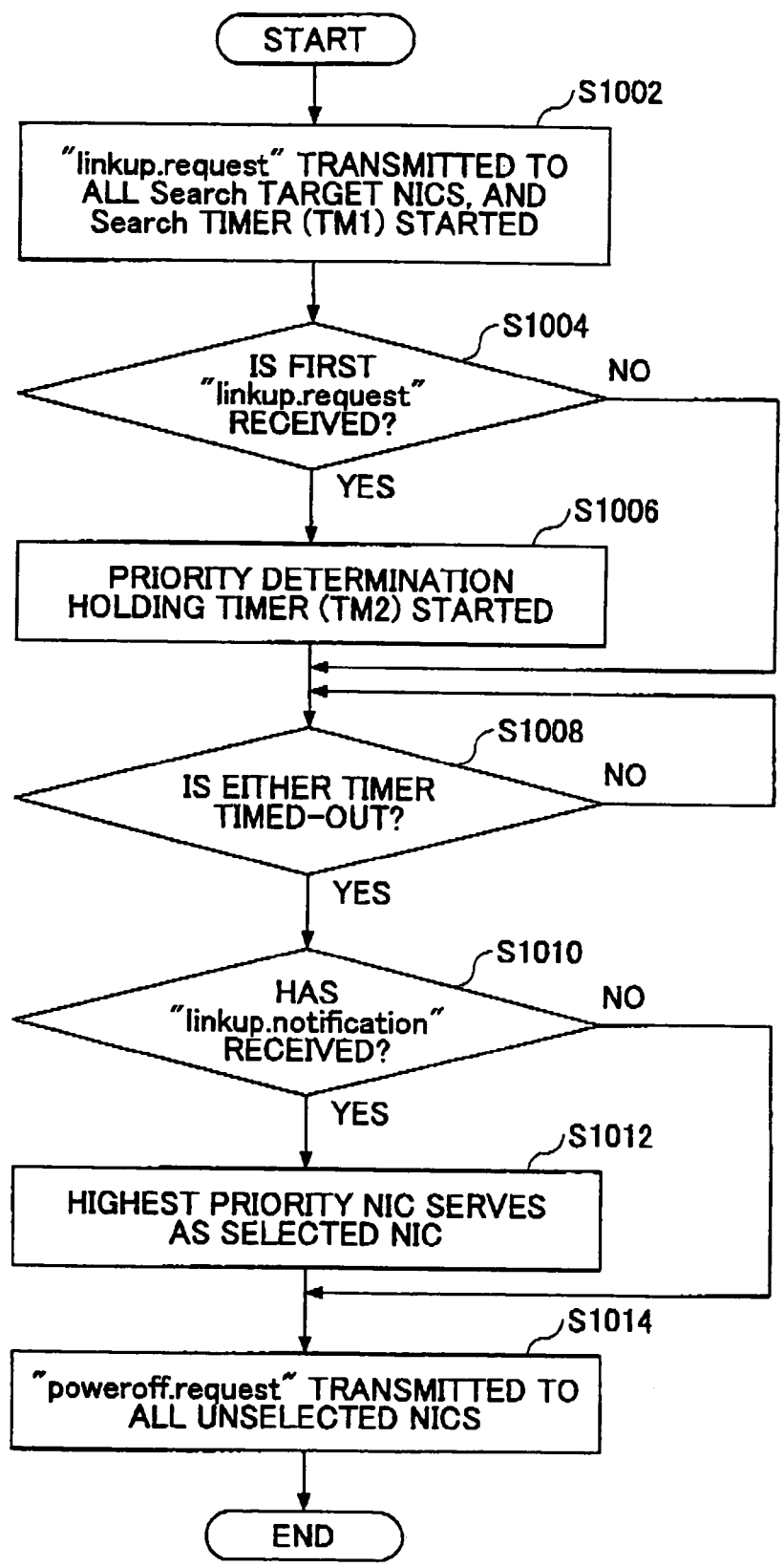
FIG. 11 is a flowchart showing an operation of the interface manager according to the embodiment of the present invention.

Next, a process of NIC Search is described with reference to FIG. 11.

In the NIC Search process, three conditions are provided by a processor of the interface manager MIM processor, namely, an identifier of an NIC that is a Search object, a Search execution time, and a priority determination holding time.

First, the control information exchange unit 11 transmits "linkup.request" of the control information that requests functions to be turned on to all NICs being Search objects, and starts a Search execution-time timer (TM1) (Step S1002).

It is determined whether the control information exchange unit 11 of the interface manager MIM receives the control information "linkup.notification" from a first connectable NIC (Step S1004).

If the control information exchange unit 11 receives the control information "linkup.notification" from the first connectable NIC (YES at Step S1004), a priority determination holding timer (TM2) is started (Step S1006). Otherwise, if the control information exchange unit 11 does not receive the control information "linkup.notification" from the first connectable NIC (NO at Step S1004), nothing is carried out and the process proceeds to Step S1008.

Next, it is determined whether either of the Search execution-time timer (TM1) and the priority determination holding timer (TM2) is timed-out (Step S1008).

If either of TM1 and TM2 is timed-out (YES at Step S1008), the attribute information extraction unit 13 extracts the attribute information from the control information, and determines whether there is an NIC that provides "linkup.notification", i.e., whether "linkup.notification" has been received (Step 1010).

If "linkup.notification" is received (YES at Step S1010), the interface-card selection unit 14 selects a NIC that has the highest priority as the selected NIC, and provides notification to that effect to the processor (Step S1012). Otherwise, if "linkup.notification" is not received (NO at Step S1010), nothing is carried out and the process proceeds to Step S1014.

Next, the interface-card selection unit 14 discards "notification" to NICs other than the selected NIC, and transmits "poweroff.request" that is the control information requesting functions be turned off (Step S1014). The power consumption of the unselected interfaces can be reduced in this way.

Alternatively, the NIC Search process may be carried out such that the processor provides the number of NICs to mount, "notification" from the NICs is received, and NIC selection is performed. Since the number of NICs is known in this way, the interface manager MIM can determine whether all NICs have answered without referring to the time-out of Step S1008. In this way, time required for selecting a NIC can be shortened.

Further, the processor may give the priority of the presently Active NIC, and the number of Search object NICs may be predetermined based on the priority. In this way, it can be determined whether "linkup.notification" that the interface manager MIM receives is higher than the presently Active NIC. Accordingly, when a NIC having a higher priority responds, the selection process can be finished, which shortens the time required for selection of the NIC. Further, since the order of the priority of "linkup.notification" received by the interface manager MIM can be known, the selection process can be ended when a NIC having the highest priority responds, and the time required for selection of the NIC can be shortened.

Figure 12:
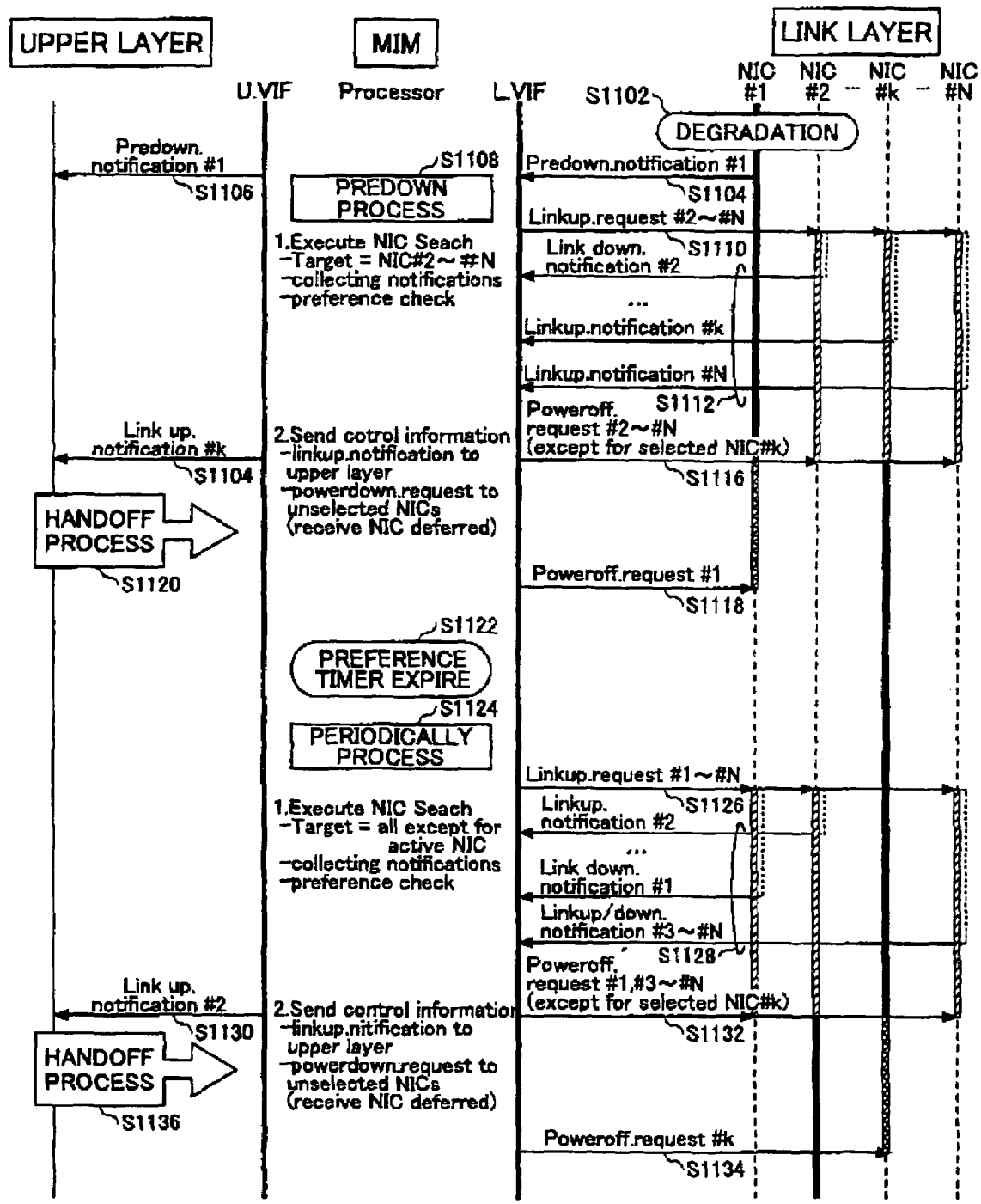
FIG. 12 is a sequence diagram showing an operation of the interface manager according to the embodiment of the present invention.

Next, operations of the interface manager MIM of the mobile node MN in which two or more network interface cards are mounted are described with reference to FIG. 12.

Here, the case where a mobile node #1 (NIC#1), being Active NIC, performs a hand-off is described.

As described above, according to the interface manager MIM of the embodiment, Tipper.VIF exchanges the control information with the upper layer; and Lower.VIF exchanges the control information with the NICS.

When degradation of a link layer occurs (Step S1102), NIC#1 that is Active NIC provides control information "pre-down.notification #1" that purports that the continuation of connection is difficult (Step S1104).

The interface manager MIM provides the received "pre-down.notification" to Upper Layer (Step S1106).

The interface manager MIM starts the NIC Search process based on the flow of operations described with reference to FIG. 11 (Step S1108). In the NIC Search, NIC#2 through NIC#N are made the Search target (N is a positive integer), and "notification" (s) are acquired. Further, Preference is determined in the NIC Search. That is, the control information "linkup.request" for turning on NIC functions is transmitted to all NICs other than Active NIC (Step S1110).

Each NIC that receives "linkup.request", in the link layer determines the connection availability. If the connection is available "linkup.notification" is provided. Otherwise, i.e., if the connection is impossible, "linkdown.notification" is provided (Step S1112).

The attribute information extraction unit 13 of the interface manager MIM extracts "linkup.notification" from the control information obtained while performing the WIC Search process, and stores it in the storage unit 12. The interface-card selection unit 14 sets a NIC that has the highest priority as Active NIC, and the old Active NIC is made Receive NIC.

Further, the interface-card selection unit 14 of the interface manager MIM provides "linkup.notification" of the new Active NIC to the upper layer (Step S1114), discards "notification" of all other NICs, and transmits the control information "poweroff.request" that requests that functions be turned off to the NICs other than Active NIC and Receive NIC (Step S1116). A timer that postpones turning the functions of Receive NIC off is set up, and "poweroff.request" is transmitted to Receive NIC when this timer expires (Step S1118).

The upper layer determines the connectivity to the NIC as notified by "linkup.notification", and performs the control accompanied by updating of the route, for example, a hand-off process (Step S1120).

If the cycle of performing the NIC Search process, for example, when the Preference timer defined for every set of Preference expires (Step S1122), the interface manager MIM determines the connectivity to each NIC (Step S1124). The Preference timer cycle is the duration from starting and to expiration of, for example, the Preference timer.

First, the NIC Search process is started for all NICs other than Active NIC. In the NIC Search process, the NICs other than Active NIC are set as the searching target, and the "notification(s)" are acquired. Further, Preference is determined in NIC Search. That is, the control information "linkup.request" that requests turning on of the functions of each NIC is transmitted (Step S1126).

Each NIC determines the connectivity of the link layer as soon as the functions are turned on. If the connection is available, "linkup.notification" is provided to the interface manager MIM; and if the connection is impossible, "linkdown.notification" is provided to the interface manager MIM (Step S1128).

The interface-card selection unit 14 of the interface manager MIM determines a HIC that has the highest priority out of "linkup.notification" (s)" obtained by the NIC Search process as the selected NIC, and compares its priority with the presently Active NIC.

In this case, the interface manager MIM may select two or more NICs as selected NICs as long as conditions are met. That is, "linkup.notifications" of the NICs that meet the conditions are provided to the upper layer.

If the priority of the selected NIC is higher than Active NIC, the interface-card selection unit 14 of the interface manager MIM sets up the selected NIC as new Active NIC, and changes the Active NIC until then into Receive NIC. In this case, the interface-card selection unit 14 of the interface manager MIM provides "linkup.notification" of the new Active NIC to the upper layer (Step S1130), discards "notifications" from other NICs, and provides the control information "poweroff.request" that requests turning off of the functions to all NICs other than Active NIC and Receive NIC (Step S1132). Further, the interface manager MIM sets up the timer that postpones turning off of the functions of Receive NIC, and transmits "poweroff.request" as soon as the timer is expired (Step S1134).

The upper layer determines the connectivity to the NIC as "linkup.notification", then signals and performs the control accompanied by updating of the route, for example, a handoff process (Step S1136).

If the priority of the selected NIC is lower than Active NIC, the interface manager MIM discards notifications of all NICs that serve as the Search object, and transmits control information "poweroff.request" for turning the functions off.

Next, the Preference timer for starting the Search process is started.

In this manner, the mobile node that has two or more interfaces can continue communications using a suitable interface with the attribute corresponding to conditions. Further, power-saving is also realized by turning off the functions of unselected interfaces.

Further, according to the embodiment, the interface manager MIM exchanges control information with interfaces and selects only an interface that has the attribute that agrees with given conditions such that exchange of control information is enabled to the upper layer.

In the cases such as when the attribute of the interface is changed and no longer agrees with the conditions, and when the conditions are changed, an interface that agrees with the conditions is searched for by exchanging the control information with the interfaces. An interface that agrees with the conditions is found by periodically exchanging the control information with the interfaces and comparing with the presently Active interface.

According to the embodiment described above, a suitable interface is automatically selected by determining the availability of the NIC, and the like, by the control information being exchanged with the interface manager MIM and the network interface cards NIC. Nevertheless, a suitable interface may be automatically selected by determining the availability of the NIC, and the like, by using a data packet received by an NIC that is newly installed in the mobile node.

Next, the power-saving effect of the interface manager MIM is described.

The power-saving effect of the interface manager MIM depends on the time during which the network interface cards NIC function. Except for Active NIC that continues operating, all NICs are turned on only when the periodic NIC Search is processed. Further, when Active NIC is changed, and the old Active NIC is made Receive NIC, the Receive NIC continues to be operational for a predetermined period, i.e., Receive NIC timer. Accordingly, the period of Receive NIC timer also influences the power-saving effect.

The power-saving property that depends on NIC Search cycle and Search time is described.

A mobile node MN that mounts N NICs operates the interface manager MIM with a Search time $T_2$ and a Preference timer $T_{pref}$. Power consumed by NIC#k is expressed by $P_k$, and the order of priority is represented by $k=1, 2, \ldots, N$.

When NIC#1, which is of the highest priority, is Active NIC, other NICs are turned off. In this case, the total of the power consumed by the NICs is $P_1$ consumed by NIC#1. In the case that a NIC other than the highest priority NIC is Active NIC, each NIC functions for a period $T_2$ within the cycle $T_{pref}$. Therefore, the power consumption $P_{mim}$ of the NICs when the MIM operates can be expressed by the following Equation 1, where p is a probability that NIC#1 having the highest priority is Active NIC.

$$P_{min} = p\alpha P_1 + (1-p)\left\{\alpha_{act}P_{act} + \left(\sum_{k=1}^{N} P_k - P_{act}\right)(T_2/T_{pref})\right\} \quad \text{[Equation 1]}$$

In Equation 1, a power-saving ratio $\alpha_k$ (<1) is taken into consideration for Active NIC. If the NICs are operational/functional for a long time, the power consumption is considered to be decreased by power-saving control of the link layer, and it is assumed that it differs from the power consumption in the case of periodically turning on and off the function of the same NIC. Further, as for a mobile node MN that does not mount a MIM, all NICs are always functioning, and power consumption $P_{nomim}$ is expressed by the following Equation 2.

$$P_{nomim} = \sum_{k=1}^{N} \alpha_k P_k \quad \text{[Equation 2]}$$

Although the power consumption of each NIC varies by the kind of the link layer, the kinds of NICs, operating states, and individual differences, the power consumption by the MIM in a steady state, where there is no NIC change, is evaluated, Here, the power consumption $P_k$ of a NIC, and the power-saving ratio $\alpha_k$ are assumed the average values of all the NICs. Then, a power saving ratio η, with and without the MIM, i.e., $P_{mim}/P_{nomim}$ is expressed as follows.

$$\eta = p(1/N) + (1-p)(1/N + ((N-1)/\alpha N)(T_2/T_{pref}))$$

Figure 13:
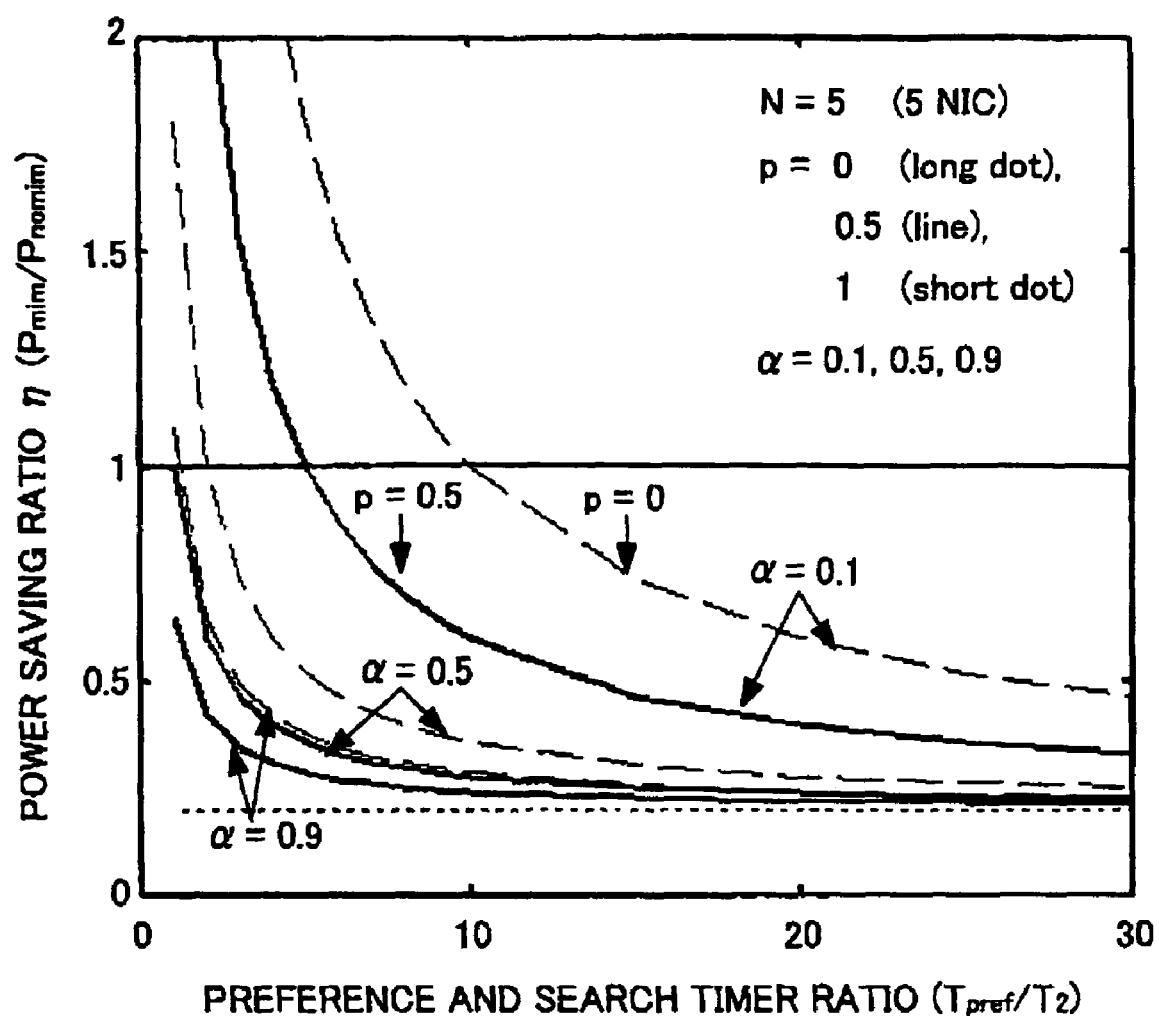
FIG. 13 is a graph for describing a power-saving effect of the interface manager according to the embodiment of the present invention.

The power saving ratios η according to the ratios of NIC Search cycle to Search time ($T_{pref}/T_2$) of the MIM are shown in FIG. 13. From the curves shown in FIG. 13, it is concluded that even when the NIC#1 having the highest priority is not set as Active NIC, i.e., p=0, and α=0.1, the power saving ratio η becomes smaller than 1, if time ratio $T_{pref}/T_2$ is set greater than the inverse value α (i.e., $T_{pref}/T_2 > 1/α$).

The Search time $T_2$ is a response latency time of a NIC corresponding to a linkup request in the NIC Search process, and depends on a time required until the link layer of the NIC of the MN determines the connectivity. As described above, if the NIC Search cycle $T_{pref}$ is set to be greater than $T_2/α$, the power-saving effect by the MIM is obtained.

In addition, as for the upper limit of $T_{pref}$, a time required for returning to a NIC having a higher priority serves as a standard. Even if a NIC other than the highest priority NIC becomes available, the NIC function is turned off until the periodical NIC Search starts. That is, an expected value of the time to return to the higher priority NIC is equal to $T_{pref}$.

Next, a process of the Receive NIC timer and the upper layer is described.

When Active NIC is changed (from an old Active NIC to a new Active NIC), the old Active NIC is made Receive NIC, and only packet reception is enabled until the Receive NIC timer expires, when a poweroff command is provided by the MIM for turning off the functions. Since the new Active NIC is operational, it may be considered that the Receive NIC can be made unoperational in a short time for the sake of power-saving. However, since the control action of the upper layer takes time for changing the Active NIC (from the old Active NIC to the new Active NIC), the Receive NIC timer allows continuous packet reception from the old Active NIC for a predetermined time. As for the length of the predetermined time, the time required for the control action of the upper layer serves as a standard.

When the subnet is changed pursuant to the change of the NIC of the MIM, the mobility control of IP layer performs a hand-off control of the IP layer. Accordingly, the IP mobility control is provided to the upper layer, for example, and an optimal time for the Receive NIC timer of the MIM is obtained. The hand-off time of the IP layer is considered to be equal to the sum of the time from connectivity loss of the present router to a time when a new router is found, and until the route is updated.

As for determining the connectivity loss according to the conventional RFC2461, the standard is 30 seconds after receiving a router advertisement (RA) or a neighboring advertisement (NA). According to the mobile IPv6, while RA is provided in a short cycle, determining time is specified by Advertise Interval. Further, in the improved hierarchical MobileIP (HMIP-B) or IPP, it is proposed that when linkup information is provided from the link layer, RS be transmitted, and a router search process be started such that the determination time is shortened. As described above, the response time and the time required for updating of the route serve as the standard of Receive NIC timer in this case.

Although the embodiment is described about the paging control and the hand-off control of the mobile communications system, this is only an example, and the present invention is applicable to other cases such as control of changing an interface during communications.

Next, a process performed by the upper layer is described.

Next, the embodiment is described with reference to FIGS. 14 through 17, wherein a mobile IP is mounted in the upper layer, a mobile node 240 equipped with a NIC of cellular and a NIC of WLAN moves into the service area of a WLAN base station 230 from the service area of a cellular base station 220, and "linkup.notification" is provided by the MIM. Note that the present invention is applicable not only to the mobile IP, but also other extended methods.

Figure 14:
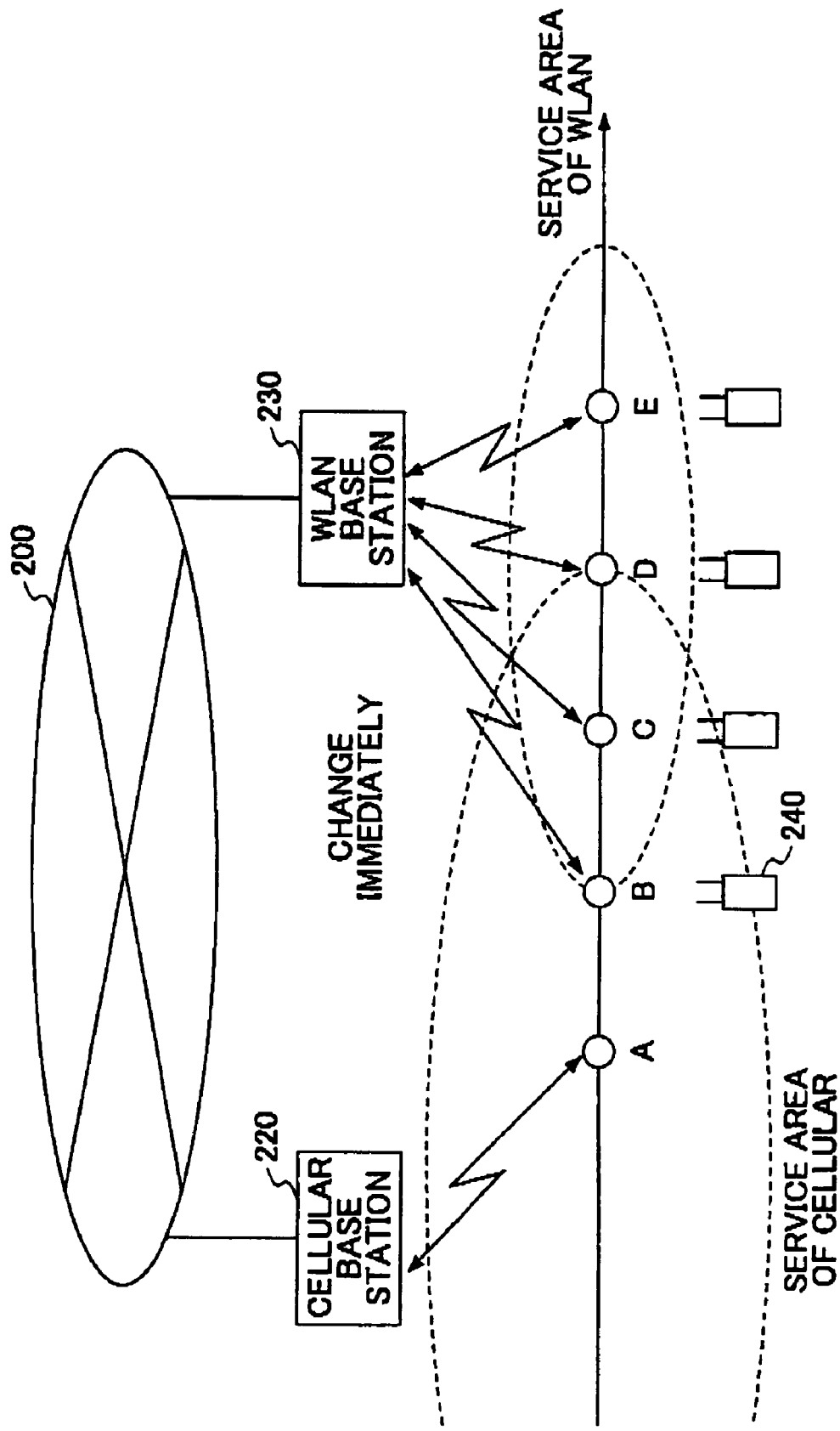
FIG. 14 is a network diagram showing an operation of the mobile node according to the embodiment of the present invention.

As shown in FIG. 14, the cellular base station 220 and the WLAN base station 230 are connected to a communication network 200, and the mobile node 240 including the NIC of cellular and NIC of WLAN moves into the service area of the WLAN base station 230 from the service area of the cellular base station 220. Here, a part of the service area by the cellular base station 220 and a part of the service area of the WLAN base station 230 overlap. Accordingly, Point A is served by the cellular base station 220; Points B, C, and D are served by the cellular base station 220 and the WLAN base station 230 overlapping; and Point E is served by the WLAN base station 230.

The mobile node 240 of the embodiment keeps searching for a connectable radio link, and establishes a connection to the WLAN base station 230 at Point B. When the connection is established to the WLAN base station 230 at Point B, and a connection-confirmation message is provided to the MIM, the MIM determines that a new NIC is found, and the interface-card selection unit 14 of the MIM starts the process described above and determines whether a connection to the new NIC is to take place. If the interface-card selection unit 14 determines that the connection should be made, the control unit 15 directs the upper layer manager 100 to connect to the WLAN base station 230. The upper layer manager 100 requests an IP address from the WLAN base station 230 based on the direction of the control unit 15. For example, a Router solicitation message is transmitted, thereby inquiring about the existence of a subnet and the managed IP address.

In response to the Router solicitation message, the WLAN base station 230 provides the information about the IP to the mobile node 240. When the information about IP is received, the mobile node 240 provides the information to the upper layer manager 100. The upper layer manager 100 directs the position information updating unit 110 to rewrite the position information registered based on the information about IP. That is, change of Default gateway is directed. The position information updating unit 110 rewrites the position information registered according to the directions from the upper layer manager 100. That is, Default gateway is changed. In this way, packets so far transmitted via the cellular NIC and the cellular base station 220 are now transmitted via the WLAN NIC and the WLAN base station 230.

Further, the upper layer manager 100 generates a care-of address of the WLAN NIC and a Binding update message for registering the care-of address, and provides them to a home agent. In this way, packets from the network so far received via the cellular base station and the cellular NIC are now received via the WLAN base station and the WLAN NIC.

As described above, as soon as the link connection to the WLAN is acquired at Point B, the mobile node starts transmitting and receiving packets via the WLAN NIC, given that address registration to the home agent has been carried out with the address assigned to the WLAN NIC. In this manner, when the mobile node passes Point D, i.e., exits the service area of the cellular base station 220, since it has been communicating via the WLAN base station 230, the communications are not interrupted by the cellular station being disconnected.

Figure 15:
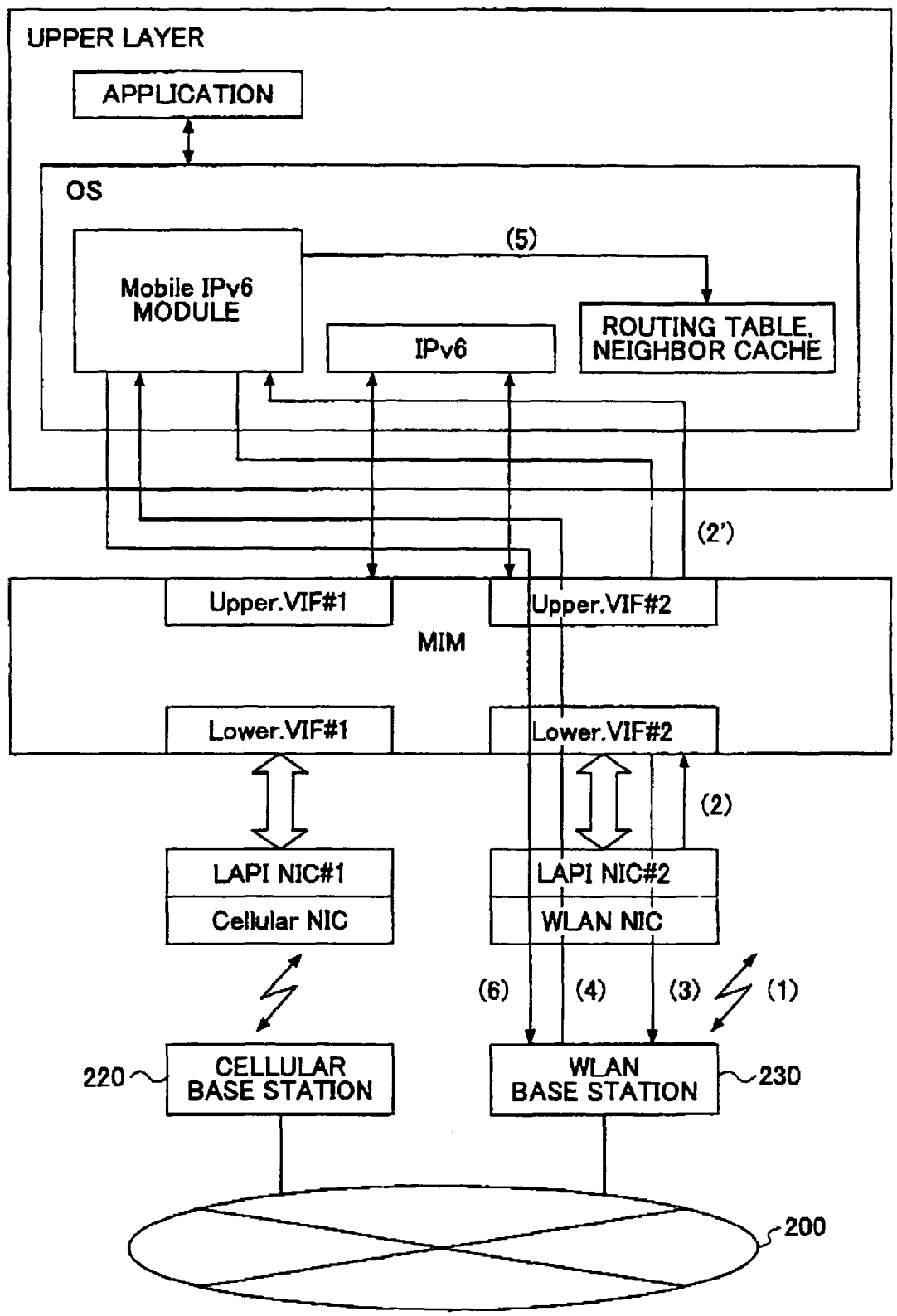
FIG. 15 is a block diagram showing the logical configuration of the mobile node according to the embodiment of the present invention.

Next, the logical configuration of the upper layer is described with reference to FIG. 15.

The upper layer is located immediately above the MIM in the protocol stack of the mobile node MN#1. Further, the interface manager MIM is invisible from an upper layer protocol and applications. Further, a driver is replaced by the MIM.

The upper layer is equipped with the applications that include an OS (Operating System), and a Web browser that operates on the OS. The OS includes IPv6, and a Mobile IPv6 module connected to Upper.VIF of the MIM. The OS further includes Routing table and Neighbor cache connected to the Mobile IPv6 module.

When a certain NIC establishes a new connection, the Mobile IPv6 module transmits a Router solicitation message packet, and receives Router advertisement message in response to the Router solicitation message packet transmitted via the NIC. Further, Default gateway is set up based on Router advertisement message. Further, an IP address of a NIC that is located the nearest, and is available, is registered with the home agent as the care-of address.

Routing table and Neighbor cache store the IP address of Default gateway, etc.

Next, operations of the upper layer are described with reference to FIG. 15.

When the mobile node is at Point A, which belongs to the service area of the cellular base station 220, packets are transmitted and received using the cellular NIC. When the mobile node comes to Point B, it performs the following process.

(1) The WLAN NIC establishes a connection to the WLAN base station. (2) A connection-confirmation message is provided to the MIM from a WLAN NIC driver. (2') When the connection-confirmation message is provided, the MIM determines whether it is advantageous to use the WLAN based on, for example, priority as described above. For example, if the mobile node is moving at a high speed, it would determine that it is more advantageous to continue using the cellular. If the MIM determines that it is more advantageous to use WLAN, a connection-confirmation message is provided to the Mobile IPv6 module.

On the other hand, if the MIM determines that it is more advantageous to continue using the cellular, nothing is carried out. In this case, the mobile IP continues communications by the cellular, disregarding the availability of the WLAN. As described above, the MIM can control the upper layer, for example, the mobile IP.

(3) The Mobile IPv6 module that receives the connection-confirmation message originates a Router solicitation message, and transmits the message via the WLAN NIC. (4) The WLAN base station transmits Router advertisement message to the mobile node in response to the Router solicitation message.

(5) The Mobile IPv6 module that receives the Router advertisement message via the WLAN NIC sets the WLAN base station 230 as the default Gateway. After this setup, packets that the mobile node 240 transmits are transmitted to the WLAN base station 230.

(6) Further, the Mobile IPv6 module generates a care-of address of the WLAN NIC, and a Binding update message for registering the care-of address; and transmits the Binding update message to the home agent. After registration, the mobile node 240 receives packets addressed to the mobile node 240 via the WLAN base station 230 and the WLAN NIC. In this way, the mobile node that moves between different systems, for example, cellular and WLAN, can move between the systems without the communications being interrupted. That is, the system can be switched without interruption.

Next, operations of the mobile node according to the present embodiment are described with reference to FIG. 16 and FIG. 17.

The mobile node determines whether a new NIC is found (Step S1602).

If a new NIC is found (YES at Step S1602), the MIM determines whether priority of the newly found NIC is higher than Active NIC at present (Step S1604).

If the priority of the newly found NIC is higher than Active NIC at present (YES at Step S1604), the MIM makes the Active NIC at present into Receive NIC, and the newly found NIC into Active NIC (Step S1606).

If a NIC is not newly found (NO at Step S1602), or if the priority of the newly found NIC is not higher than Active NIC at present (NO at Step S1604), the process returns to Step S1602.

Next, OVID corresponding to Active NIC of the MIM provides "linkup.notification" to the Mobile IPv6 module of the upper layer (more than or equal to L3) as a connection-confirmation message (Step S1608).

Next, the Mobile IPv6 module generates the Router solicitation message, and transmits the message to the WLAN base station via the WLAN NIC (Step S1702).

The WLAN base station transmits Router advertisement message to the mobile node in response to the Router solicitation message (Step S1704).

The mobile node sets the WLAN base station as Default gateway in the Mobile IPv6 module, when the Router advertisement message is received (Step S1706). In this way, packets that the mobile node transmits are transmitted to the WLAN base station after this setup.

Next, the Mobile IPv6 module generates the care-of address of the WLAN, and the Binding update message for registering the care-of address; and transmits the message to the home agent (Step S1708). After registering the care-of address, the mobile node can receive packets addressed to the mobile node via the WLAN base station and WLAN NIC.

According to this embodiment, in the IPv6 mobility control, the router that is connected to the interface, connection to which is confirmed as being the most recent, is set as Default Router. In this way, the interface used for packet transmission is recognized, and an interface providing the highest availability at this time can be used as the transmitting interface. Further, in an IP based mobile communication network, losses in the case of the mobile node performing hand-offs can be reduced.

In the embodiment described above, although the mobile node that includes the MIM has been described, a mobile node that does not have an MIM can move between systems without communications being interrupted. In the case of the mobile node without the MIM, when a new NIC is found, a driver provides a connection-confirmation message to the upper layer, and the process described with reference to FIG. 17 is performed.

Further, although the case where the mobile node moves between the cellular system and the WLAN system has been described, the present invention is also applicable to the cases between other systems.

AVAILABILITY TO INDUSTRY

The mobile node, the control method of the mobile node, and the mobile node control program of the present invention are applicable to a mobile node equipped with two or more interfaces.

Further, the present invention is not limited to these embodiments, but variations and modifications may be made without departing from the scope of the present invention.

The present application is based on Japanese Priority Application No. 2004-193717 filed on Jun. 30, 2004 and No.

2004-275589 filed on Sep. 22, 2004 with the Japanese Patent Office, the entire contents of which are hereby incorporated by reference.

What is claimed is:

1. A mobile node equipped with a plurality of interfaces, comprising:
    a generating unit configured to generate control information for each of said interfaces;
    an information providing unit configured to provide said control information provided by each of said interfaces to an upper layer;
    a routing controlling unit configured to perform at least one of determining connectivity and updating a route based on the control information; and
    a selecting unit configured to select one of the interfaces that has an attribute that corresponds to predetermined conditions, wherein
    said selecting unit directs interfaces other than the selected interface to turn off functions a predetermined time after the selected interface is selected, and
    said selecting unit is further configured to reassess, within a time period, conditions and to determine if another one of the interfaces should be activated, said time period being greater than a value equal to said predetermined time divided by a power saving ratio.

2. The mobile node as claimed in claim 1, further comprising:
    an information exchanging unit configured to exchange said control information with each of said interfaces;
    an extracting unit configured to extract attribute information of said interfaces from said control information; and
    a storage unit configured to store said attribute information.

3. The mobile node as claimed in claim 1, wherein:
    said generating unit generates said control information based on a communication state provided by at least one of the upper layer and a lower layer, which layers are in a protocol stack of said mobile node.

4. The mobile node as claimed in claim 2, wherein:
    said selecting unit is configured to select one of the interfaces based on a Preference that defines connection priority of said interfaces.

5. The mobile node as claimed in claim 2, wherein:
    said selecting unit, when selecting a new one of the interfaces different from a currently operating one of the interfaces, enables the currently operating interface to receive, and enables the newly selected interface to send and receive.

6. The mobile node as claimed in claim 1, wherein:
    said generating unit periodically generates the control information at a predetermined interval.

7. The mobile node as claimed in claim 2, wherein:
    said selecting unit selects one of the interfaces based on the priorities of said interfaces.

8. The mobile node as claimed in claim 2, wherein:
    said selecting unit selects one of the interfaces based on data packets received via said interfaces.

9. The mobile node as claimed in claim 1, wherein:
    said routing controlling unit performs at least one of determining connectivity, and updating a route by causing one of the interfaces in use to switch to a connection state.

10. A control method of a mobile node equipped with two or more interfaces, comprising:
    a step of generating control information for each of said interfaces;
    a step of receiving said control information provided by said interfaces;
    a step of providing said control information to an upper layer;
    a step of performing at least one of determining connectivity, and updating a route based on the control information;
    a step of selecting one of the interfaces that has an attribute that suits predetermined conditions; and
    a step of changing to the selected interface, wherein said step of selecting includes
    directing interfaces other than the selected interface to turn off functions a predetermined time after the selected interface is selected, and
    reassessing, within a time period, conditions and to determine if another one of the interfaces should be activated, said time period being greater than a value equal to said predetermined time divided by a power saving ratio.

11. The control method of the mobile node as claimed in claim 10, further comprising:
    a step of exchanging said control information with each of said interfaces
    a step of extracting attribute information of said interfaces from said control information; and
    a step of storing said attribute information.

12. A computer readable storage medium including stored thereon a control program of a mobile node equipped with two or more interfaces, the control program including instructions configured to cause a computing device to execute a method comprising the steps of:
    enabling the mobile node to function as a generating unit to generate control information for each of said interfaces;
    enabling the mobile node to function as an exchanging unit to exchange said control information with each of said interfaces;
    enabling the mobile node to function as an extracting unit to extract attribute information of said interfaces based on said control information;
    enabling the mobile node to function as a storage unit to store said attribute information;
    enabling the mobile node to function as a selecting unit to select one of the interfaces that has an attribute that suits predetermined conditions;
    enabling the mobile node to function as an information providing unit for providing the control information provided by each of said interfaces to an upper layer;
    a step of selecting one of the interfaces that has an attribute that suits predetermined conditions; and
    a step of changing to the selected interface, wherein said step of selecting includes
    directing interfaces other than the selected interface to turn off functions a predetermined time after the selected interface is selected, and
    reassessing, within a time period, conditions and determines if another one of the interfaces should be activated, said time period being greater than a value equal to said predetermined time divided by a power saving ratio.

* * * * *